(12) United States Patent
Schooley et al.

(10) Patent No.: US 11,677,429 B2
(45) Date of Patent: Jun. 13, 2023

(54) ELECTRONIC DEVICES AND ACCESSORY DEVICES THAT PROVIDE INFORMATION TO ELECTRONIC DEVICES

(71) Applicant: Apple Inc., Cupertino, CA (US)

(72) Inventors: Stephen T. Schooley, Menlo Park, CA (US); Ross D. Arriens, Mountain View, CA (US); Sara Rusignuolo, Newport Beach, CA (US); Craig S. Ogden, Mountain View, CA (US); Ho Cheung Chung, Sunnyvale, CA (US); Vusthla Sunil Reddy, Cupertino, CA (US); Jeremy D. Bataillou, San Francisco, CA (US); Xinping Zeng, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/446,440

(22) Filed: Aug. 30, 2021

(65) Prior Publication Data

US 2021/0391885 A1 Dec. 16, 2021

Related U.S. Application Data

(63) Continuation of application No. 16/517,383, filed on Jul. 19, 2019, now Pat. No. 11,108,424.
(Continued)

(51) Int. Cl.
*H04B 1/3827* (2015.01)
*H04B 1/3888* (2015.01)
(Continued)

(52) U.S. Cl.
CPC ........... *H04B 1/3888* (2013.01); *H04B 1/385* (2013.01); *H04M 1/72412* (2021.01);
(Continued)

(58) Field of Classification Search
CPC .... H04B 1/385; H04B 1/3888; H04B 1/3827; H04B 2001/3866; H04M 1/72412; H04M 1/72454; H04W 12/06
See application file for complete search history.

(56) References Cited

U.S. PATENT DOCUMENTS

2015/0043424 A1 2/2015 Mitchell
2017/0235339 A1 8/2017 Scales et al.
(Continued)

*Primary Examiner* — Tuan H Nguyen
(74) *Attorney, Agent, or Firm* — BakerHostetler

(57) ABSTRACT

Accessory devices are described herein. An accessory device may include a receptacle for receiving an electronic device. The accessory device may include a case that covers the housing of the electronic device, or a folio that additionally includes a cover can conceal the display of the electronic device. Accessory devices described herein further include wireless circuitry used to communicate with wireless circuitry in the electronic device. The wireless circuitry can be used for various functions and features. For instance, the wireless circuitry in the accessory device can respond to authentication requests from the electronic device, and/or to send authentication requests to the electronic device. Further, the wireless circuitry in the accessory device can send information to the electronic device. Such information may include properties of the accessory device, or information stored on the accessory device that is presented on a display of the electronic device.

20 Claims, 13 Drawing Sheets

Related U.S. Application Data

(60) Provisional application No. 62/825,622, filed on Mar. 28, 2019.

(51) Int. Cl.
*H04M 1/72412* (2021.01)
*H04M 1/72454* (2021.01)
*H04W 12/06* (2021.01)

(52) U.S. Cl.
CPC . *H04M 1/72454* (2021.01); *H04B 2001/3866* (2013.01); *H04W 12/06* (2013.01)

(56) References Cited

U.S. PATENT DOCUMENTS

| | | |
|---|---|---|
| 2017/0310353 A1 | 10/2017 | Richardson et al. |
| 2017/0331335 A1* | 11/2017 | Brooks ................ G06F 1/1632 |
| 2019/0212784 A1 | 7/2019 | Oakeson et al. |
| 2020/0020165 A1* | 1/2020 | Tran ...................... G06N 20/10 |

\* cited by examiner

ELECTRONIC DEVICES AND ACCESSORY DEVICES THAT PROVIDE INFORMATION TO ELECTRONIC DEVICES

CROSS-REFERENCE TO RELATED APPLICATION(S)

The present application is a continuation of U.S. application Ser. No. 16/517,383, filed Jul. 19, 2019, entitled "ACCESSORY DEVICE WITH COMMUNICATION FEATURES," which claims the benefit of U.S. Provisional Application No. 62/825,622, filed Mar. 28, 2019, of the same title, the contents of all of which are incorporated by reference herein in their entirety for all purposes.

FIELD

The following description relates to accessory devices, such as cases and folios, used with portable electronic devices, such as smartphones and tablet computing devices. In particular, the following description relates to accessory devices with wireless circuitry used to communicate with portable electronic devices. As an example, an accessory device may include wireless circuitry that can communicate information to a portable electronic device when the portable electronic device is coupled/secured with accessory device. The information can be related to properties and features of the accessory device.

BACKGROUND

Accessory devices can be used to carry and protect electronic devices. Some accessory devices may include a compartment to store the portable electronic device.

SUMMARY

In one aspect, an accessory device is described. The accessory device may include a receptacle that defines an internal volume. The accessory device may further include a target that is embedded in the receptacle and detectable by a sensor carried by an electronic device that is positioned in the internal volume. The accessory device may further include wireless circuitry embedded in the receptacle. In some embodiments, a communication channel is established between the electronic device and the wireless circuitry when the target is detected by the sensor.

In another aspect, an accessory device for use with an electronic device is described. The accessory device may include a receptacle comprising a bottom wall and sidewalls extending from the bottom wall. The bottom wall and the sidewalls can define an internal volume having a size and shape to receive the electronic device. The accessory device may further include wireless circuitry embedded in the receptacle. In some embodiments, receipt of the electronic device in the internal volume causes the wireless circuitry to provide information to the electronic device. Also, in some embodiments, the information alters visual information of a display assembly of the electronic device.

In another aspect, a method for communicating with an electronic device is described. The method may include receiving, by an accessory device, the electronic device into a receptacle of the accessory device. The receptacle can carry wireless circuitry and a memory circuit that stores information in accordance with the accessory device. The method may further include the accessory device receiving, from the electronic device, communication at the wireless circuitry. The method may further include the accessory device providing, using the wireless circuitry, the information in response to the communication.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
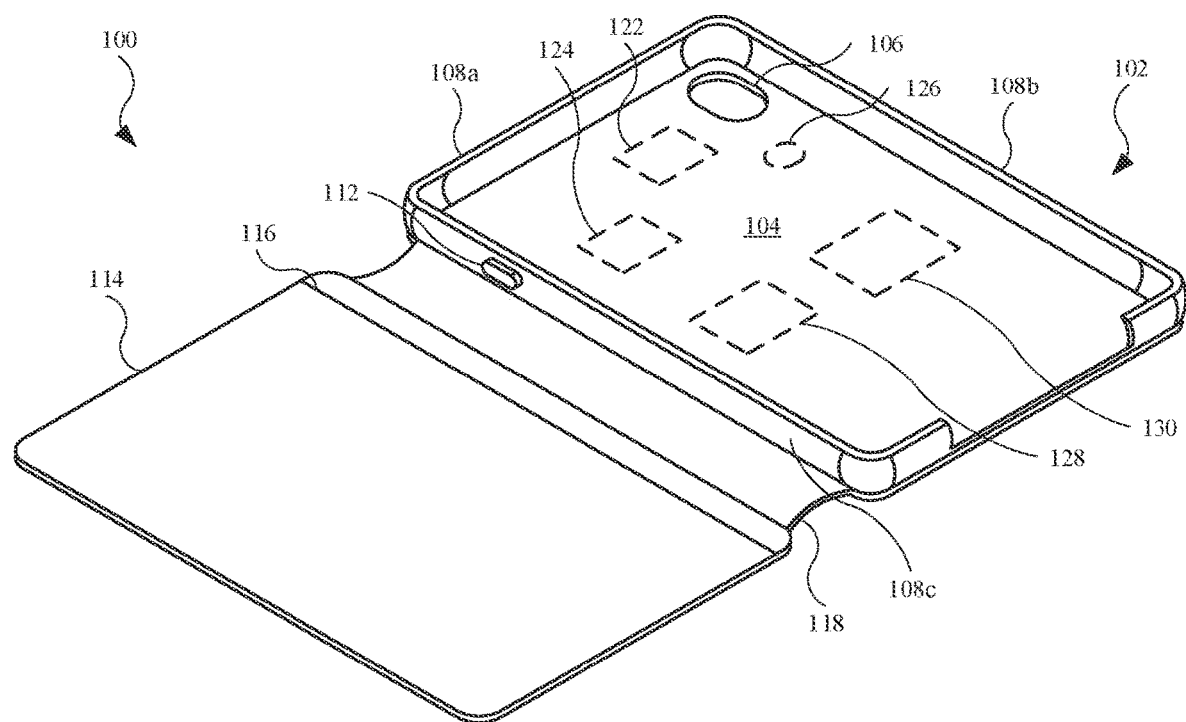
FIG. 1 illustrates an isometric view of an embodiment of an accessory device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices designed for use with electronic devices, including portable electronic devices such as mobile wireless communication devices (examples of which include smartphones and tablet devices). As described herein, accessory devices may include a case designed to receive an electronic device. Alternatively, accessory devices described herein may include a folio with both a case as well as a cover that can fold over the case to cover/conceal the electronic device, including a display of the electronic device.

Accessory devices described herein may include additional features. For instance, an accessory device may include wireless circuitry used to communicate with an electronic device that is carried by the accessory device. As a non-limiting example, wireless circuitry described herein may include wireless communication circuitry such as near-field communication ("NFC"), or communication protocol and data exchanges included in standards covered by ISO/IEC 14443 and ISO/IEC. In this regard, wireless circuitry described herein may include features such as card emulation, read/write capabilities, and/or peer-to-peer information exchange. In order to communicate with accessory devices, electronic devices described herein may also include similar wireless circuitry. While other communication protocols are possible, NFC communication may be advantageous for purposes of low-power transmission, resulting in less battery usage (i.e., less power consumption) of a battery of the accessory device.

The wireless circuitry in accessory devices described herein can be used for various tasks. For example, the wireless circuitry can respond to authentication requests from an electronic device. An authentication of the accessory device by the electronic device provides verification information to the electronic device that the accessory device is an acceptable and/or approved accessory device for use with the electronic device. The authentication process may be used to establish approved communication between the accessory device and the electronic device. Alternatively, or additionally, to establish communication, the wireless circuitry can be used to send an authentication request (defining an electronic device authentication request) to the electronic device and receive an authentication response from the electronic device so as to provide mutual authentication. Conversely, when authentication is rejected, the authentication process prevents the exchange of information between the accessory device and the electronic device. When communication between the accessory device and the electronic device is established, the accessory device can send information to the electronic device such as the type of accessory device (case or folio), the color of the accessory device, and/or the material of the accessory device, as non-limiting examples. The accessory device may also include memory that stores information related to user interest, includes stored user preferences.

Information can also be transmitted from the accessory device to the electronic device. Once the information is received, the electronic device can subsequently change one or more parameters. For example, the electronic device can add a filter to the display of the electronic device. The filter can alter an image presented on the display by applying a color to the display such that the image matches the color of the accessory device.

Accessory devices described herein may include additional features. For example, some accessory devices may include sensors, such as an ultraviolet ("UV") light sensor designed to detect ambient sunlight that is incident on the accessory device. The wireless circuitry in the accessory device can communicate information related to UV light detected from the UV light sensor, and send the information to the electronic device. The electronic device can subsequently use this information to notify a user of the ambient light conditions. Also, some accessory devices described herein may include a display. The wireless circuitry in the accessory device can receive information from the electronic device that can be presented on the display. Also, wireless circuitry described herein may supply power to passive components of the accessory device, such as a memory circuit and/or a battery.

In some instances, it may be advantageous to maintain the wireless circuitry in a normally inactive mode (in which no communication features are available) and selectively activate the wireless circuitry when desired. This can be advantageous during instances when the wireless circuitry emits radio frequency ("RF") that would otherwise interfere with a RF receiving terminal. This can be implemented in several ways. For instance, some accessory devices described herein include a target (such as a magnet) that can be detected by a sensor (such has a magnetic field sensor) in the electronic device. When the sensor detects the target, the electronic device can send a request to activate, or wake, the wireless circuitry in the accessory device. Also, accessory devices described herein include a switch used to activate the wireless circuitry.

These and other embodiments are discussed below with reference to FIGS. 1-20. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with some described embodiments. The accessory device 100, as well as other accessory devices described herein, is designed for use with mobile wireless communication devices, such as smartphones and tablet computing devices (not shown in FIG. 1). Also, the accessory device 100, and accessory devices described herein, may include a material (or materials), such as leather, plastic, synthetic leather, and/or silicone, as non-limiting examples.

As shown, the accessory device 100 includes a receptacle 102. The receptacle 102 may include a wall 104, or bottom wall, that includes an opening 106 positioned in a location corresponding to a camera(s) and a flash module (not shown in FIG. 1) of a mobile wireless communication device. The receptacle 102 may further include several sidewalls (such as a sidewall 108a, a sidewall 108b, and a sidewall 108c) that extend from the wall 104. In this manner, the receptacle 102 forms an internal volume that includes a size and shape corresponding to that of the mobile wireless communication device, and as a result, the accessory device 100 can hold/carry the mobile wireless communication device in the receptacle 102. Also, the accessory device 100 may include a button 112 located on the sidewall 108c. The button 112 is generally positioned on the sidewall 108c in a location corresponding to a button on a mobile wireless communication device when the mobile wireless communication device is positioned in the receptacle 102. In the manner, the button 112 provides an indication to a user where a button of the mobile wireless communication device is located such that the user can depress the button 112 to depress the mobile wireless communication device button.

The accessory device 100 may further include a cover 114. The cover 114 may include a sleeve 116 that can store various objects, such as portable internal power supplies, sensors, credit cards, user identification, etc. The cover 114 is connected to the receptacle 102 by a hinge 118. The hinge 118 allows relative movement between the cover 114 and receptacle 102. While the accessory device 100 is in an open position in FIG. 1, the cover 114 can rotate relative to, and be positioned on, the sidewalls of the receptacle 102 in order conceal and protect a mobile wireless communication device positioned in the receptacle 102, thereby placing the accessory device 100 in a closed positioned (shown later). It should be noted that the receptacle 102 may be referred to as a receptacle portion or a first portion, and the cover 114 may be referred to as a front cover, a flap, a front flap, or a second portion.

The accessory device 100 may include communication features, including wireless communication features, designed to communicate with mobile wireless communication device s that are carried by the accessory device 100 in the receptacle 102. For example, the accessory device 100 may include wireless circuitry 122. The wireless circuitry 122 may include NFC circuitry, as a non-limiting example. Other forms of wireless circuitry, including low-power wireless circuitry, are possible. Also, the wireless circuitry 122 may further include circuitry for processing wireless technology standards transmitted and received in a band in the 2.400 to 2.485 Gigahertz ("GHz") range, also referred to as BLUETOOTH®. The wireless circuitry 122 may include circuitry for processing wireless technology standards transmitted and received in a band in the 2.400 to 5.000 GHz range, also referred to as WI-FI®. As shown, the wireless circuitry 122 is embedded in the wall 104. However, the wireless circuitry 122 may be located and embedded elsewhere, such as in one of the sidewalls or the cover 114.

The accessory device 100 may further include a memory circuit 124 that stores programs and algorithms that can be accessed by the wireless circuitry 122 via an embedded flexible circuit (not shown in FIG. 1), as a non-limiting example. The wireless circuitry 122 is designed to communicate various features to a mobile wireless communication device, with the various features being stored on the memory circuit 124. For instance, the wireless circuitry 122 may provide information in accordance with, related to, the accessory device 100, which may include the serial number, color and/or material of the accessory device 100. Alternatively, or in combination, the wireless circuitry 122 may provide information, such as whether the accessory device 100 includes a cover 114, as some embodiments of an accessory device (shown later) may not include a cover.

In addition to the aforementioned functions, the wireless circuitry 122 may also be used for authentication purposes. For example, a manufacturer of mobile wireless communication devices may require a determination whether the accessory device 100 is made by the manufacturer and/or an approved third party accessory device manufacturer. In this regard, a mobile wireless communication device may transmit an authentication request, via wireless means, to the wireless circuitry 122 of the accessory device 100. The wireless circuitry 122 can transmit the authentication request to the memory circuit 124. The memory circuit 124 (or in some instances, the wireless circuitry 122) may include instructions for executing an authentication request. In response to the authentication request, the wireless circuitry 122 may transmit authentication information to the mobile wireless communication device. Moreover, in some instances, a mutual authentication process occurs in which the accessory device 100 transmits an authentication request, using the wireless circuitry 122, to a mobile wireless communication device and receives a response (from the mobile wireless communication device) to the authentication request in order to validate the mobile wireless communication device.

The accessory device 100 may further include a target 126 that can be detected by a mobile wireless communication device positioned in the receptacle 102. In some embodiments, the target 126 is a magnet that emits an external magnetic field that is detectable by a magnetic field sensor (not shown in FIG. 1) of the mobile wireless communication device. The target 126 can provide several benefits for the accessory device 100. For example, when a mobile wireless communication device is positioned in the receptacle and detects the target 126, communication may be initiated between the mobile wireless communication device and the accessory device 100. The communication may include an exchange of information including an authentication request, as a non-limiting example. Also, in some instances, the wireless circuitry 122 may configured as "normally off," or inactive, and is activated based a request that activates, "wakes," the wireless circuitry 122, thereby placing the wireless circuitry 122 in an active mode. The request from the mobile wireless communication device may be initiated when the mobile wireless communication device detects the target 126.

In addition to communication features, the wireless circuitry 122 may provide additional functions, such as providing power to components of the accessory device 100. For example, the wireless circuitry 122 can supply power received by a mobile wireless communication device, or another device, to the memory circuit 124, an internal power supply 128 (or battery) that stores energy, and/or processing circuitry 130. The processing circuitry 130 can execute instructions stored on the memory circuit 124 and/or the wireless circuitry 122. Although not shown, the accessory device 100 may include an inductive charging coil designed to supply power to the internal power supply 128, or other devices of the accessory device 100 that require power. It should be noted that the internal power supply 128 and the processing circuitry 130 can be in communication with the wireless circuitry 122 via an embedded flexible circuit (not shown in FIG. 1), as a non-limiting example.

Figure 2:
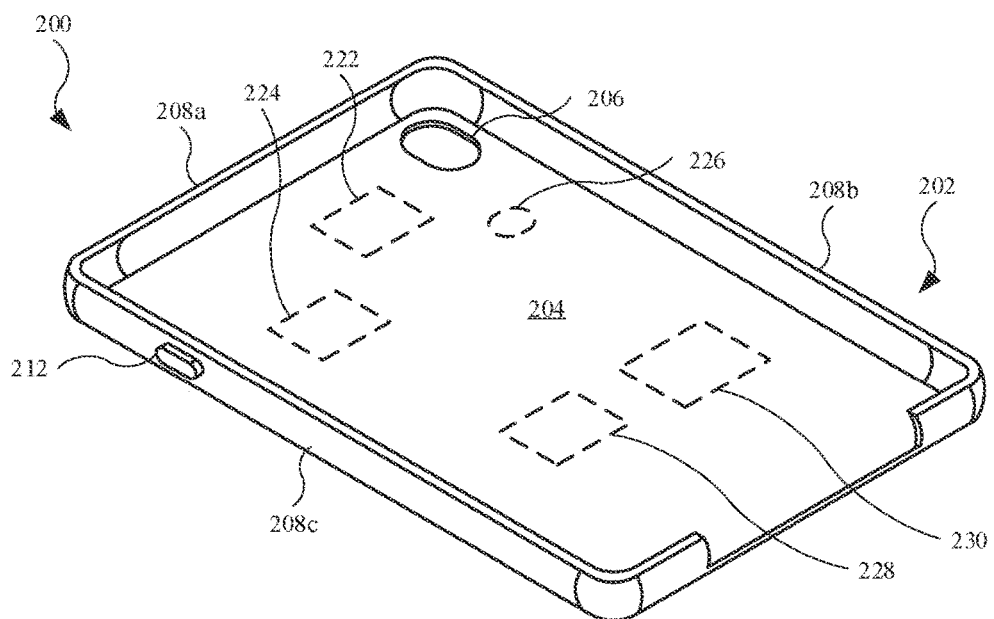
FIG. 2 illustrates an isometric view of an alternate embodiment of an accessory device, in accordance with some described embodiments.

FIG. 2 illustrates an isometric view of an alternate embodiment of an accessory device 200, in accordance with some described embodiments. The accessory device 200 may include several features shown and described for the accessory device 100 (shown in FIG. 1), with the exception of the cover 114 and the hinge 118. For example, the accessory device 200 may include a receptacle 202 designed to receive a mobile wireless communication device (not shown in FIG. 2). The receptacle 202 may include a wall 204, or bottom wall, that includes an opening 206 positioned in a location corresponding to a camera(s) and a flash module (not shown in FIG. 2) of a mobile wireless communication device. The receptacle 202 may further include several sidewalls (such as a sidewall 208a a sidewall 208b, and a sidewall 208c) that extend from the wall 204 to form an internal volume that includes a size and shape that can receive and hold/carry a mobile wireless communication device, and as a result, the accessory device 200 can hold/carry the mobile wireless communication device in the receptacle 202. Also, the accessory device 200 may include a button 212 located on the sidewall 208c used to depress a button of a mobile wireless communication device in the receptacle 202 located in the receptacle 202.

The accessory device 200 further includes wireless circuitry 222, a memory circuit 224, a target 226, an internal power supply 228, and processing circuitry 230. The wireless circuitry 222, the memory circuit 224, the target 226, the internal power supply 228, and the processing circuitry 230 may include any features and perform any functions described for the wireless circuitry 122, the memory circuit 124, the target 126, the internal power supply 128, and the processing circuitry 130, respectively, of the accessory device 100 (shown in FIG. 1).

Figure 3:
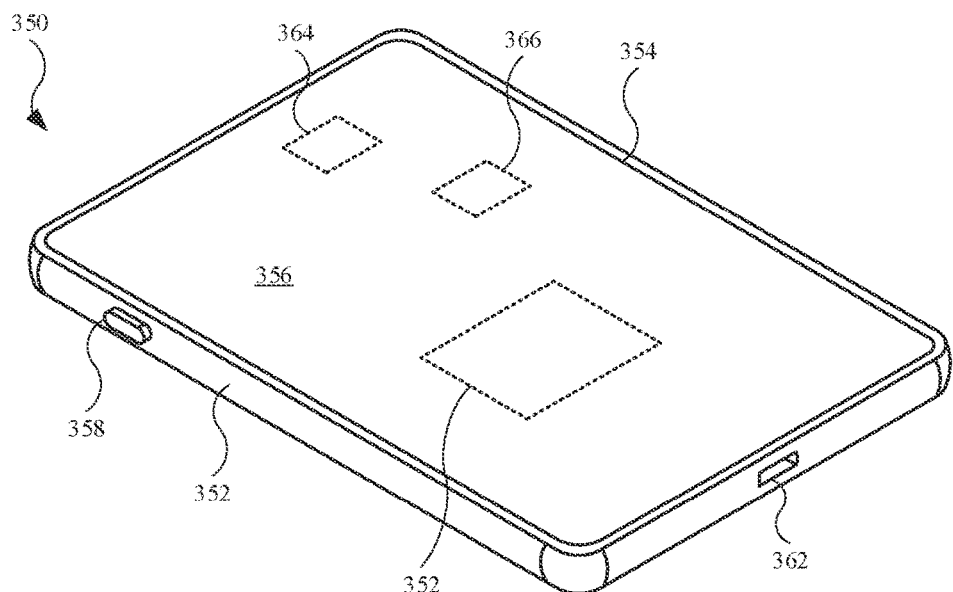
FIG. 3 illustrates an isometric view of an embodiment of an electronic device, in accordance with some described embodiments.

FIG. 3 illustrates an isometric view of an embodiment of an electronic device 350, in accordance with some described embodiments. The electronic device 350 may include a mobile wireless communication device (such as smartphone or tablet computing device) that can be used in conjunction with accessory devices described herein. As shown, the electronic device 350 include an enclosure 352, or housing, that that forms an internal volume used to store several internal components of the electronic device 350. The electronic device 350 may further include a display assembly 354 that can present visual information in the form of still images (such as pictures and textual images), as well as motion picture imagery. The display assembly 354 may include touchscreen capabilities, including capacitive touchscreen capabilities. The electronic device 350 may include a transparent protective layer 356 that covers the display assembly 354. The transparent protective layer 356 may include glass (thereby defining a cover glass), plastic, sapphire, or generally any transparent protective layer. The electronic device 350 may further include a button 358 that can be operated/actuated by a button of an accessory device (such as the button 112 shown in FIG. 1) when the electronic device 350 is positioned in a receptacle of an accessory device (such as the receptacle 102 shown in FIG. 1). The electronic device 350 may further include a port 362 that can receive a connector of a cable assembly (not shown in FIG. 3). The port 362 provides a pathway for power to the electronic device 350 as well as data transmission to and from the electronic device 350.

The electronic device 350 may include additional components that are stored by the enclosure 352. For example, the electronic device 350 may include wireless circuitry 364 designed for communication with wireless circuitry of accessory devices described herein. The wireless circuitry 364 may operate using communication protocol and standards consistent with wireless circuitry in accessory device described herein. In this regard, the wireless circuitry 364 may provide an authentication request to an accessory device, receive information related to the accessory device, and/or respond to an authentication request by the accessory device, as non-limiting features. Although not shown, the electronic device 350 may include a memory circuit that stores executable instructions used by the wireless circuitry 364.

The electronic device 350 may further a detection mechanism 366 that is designed to detect a target in an accessory device (not shown in FIG. 3). When the target is a magnet, the detection mechanism 366 may include a magnetic field sensor (such as a Hall Effect sensor or an anisotropic magneto-resistive sensor) that can detect a magnetic field emitted by the magnet. Also, the enclosure 352 may include metal components. However, a back wall (not shown in FIG. 3) of the enclosure 352 may include a non-metal material (such as glass) or a metal with an opening that permits transmission of radio frequencies and magnetic fields.

Figure 4:
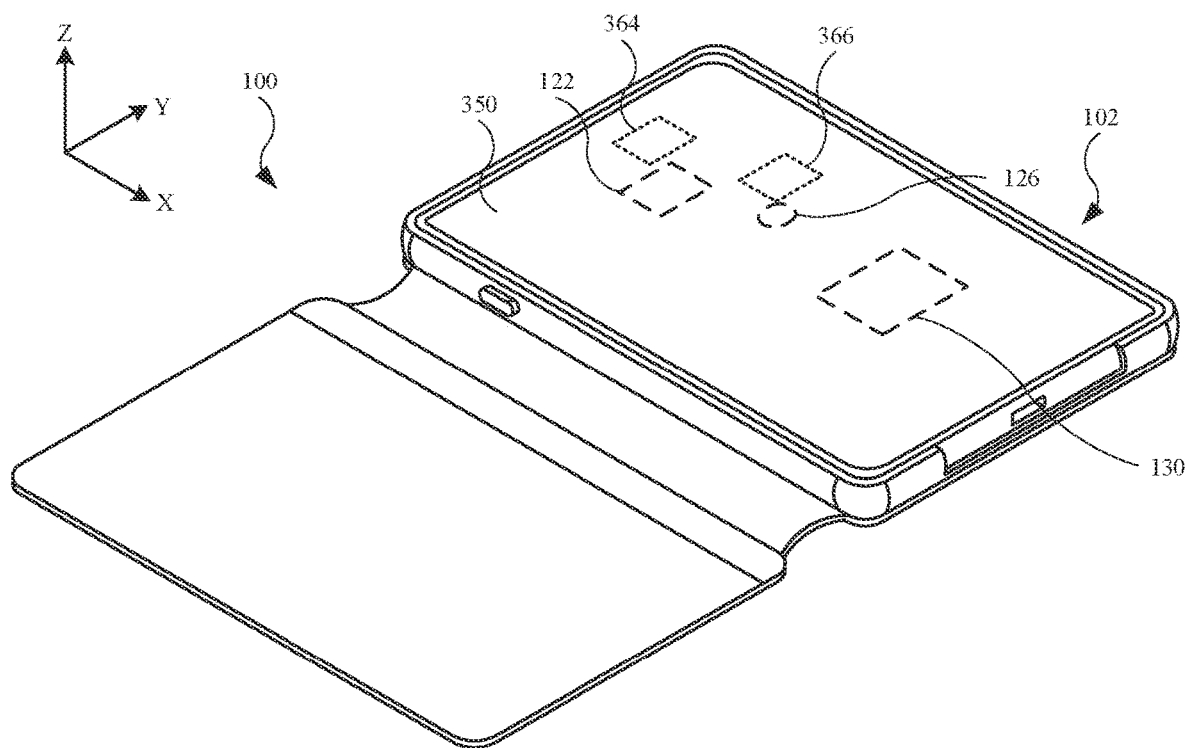
FIG. 4 illustrates an isometric view of an electronic device positioned in an accessory device, in accordance with some described embodiments.

FIG. 4 illustrates an isometric view of an electronic device positioned in an accessory device, in accordance with some described embodiments. The electronic device may include the electronic device 350 (shown in FIG. 3) and the accessory device may include the accessory device 100 (shown in FIG. 1). When the electronic device 350 is positioned in the receptacle 102 of the accessory device 100, the target 126 of the accessory device 100 is detected by the detection mechanism 366 of the electronic device 350. The detection mechanism 366 can subsequently generate and provide input that causes the wireless circuitry 364 of the electronic device 350 to initiate communication with the wireless circuitry 122 of the accessory device 100. The initiated communication may include an authentication request provided by the wireless circuitry 364 to the wireless circuitry 122, as an example. When the wireless circuitry 122 responds to the authentication request with credential information, the wireless circuitry 364 receives the credential information and provides the credential information to processing circuitry (not shown in FIG. 4) of the electronic device 350. If the credential information is authenticated/validated, the wireless circuitry 122 of the accessory device 100 may provide information related to the accessory device 100, such as color and/or material of the accessory device 100, as non-limiting examples.

In some instances, prior to the wireless circuitry 122 providing information related to the accessory device 100, the wireless circuitry 122 provides an authentication request to the wireless circuitry 364 of the electronic device 350. When the wireless circuitry 364 responds to the authentication request with credential information, the wireless circuitry 122 receives the credential information and provides the credential information to processing circuitry 130 (shown in FIG. 1) of the accessory device 100. If the credential information is authenticated/validated, the wireless circuitry 122 of the accessory device 100 subsequently provides the information in accordance with the accessory device 100. Accordingly, a mutual authentication step can occur between the accessory device 100 and the electronic device 350. Although the wireless circuitry 364 and the detection mechanism 366 are shown as being aligned (in the Z-axis) with respect to the wireless circuitry 122 and the target 126, respectively, the wireless circuitry 364 and the detection mechanism 366 can be offset (in the X- and/or Y-axis) with respect to the wireless circuitry 122 and the target 126, respectively. However, the wireless circuitry 364 and the wireless circuitry 122 should each be capable of providing sufficient transmitting power to each other, and the magnetic field (not shown in FIG. 4) of the target 126 (when the target 126 is a magnet) should be incident on the detection mechanism 366.

Figure 5:
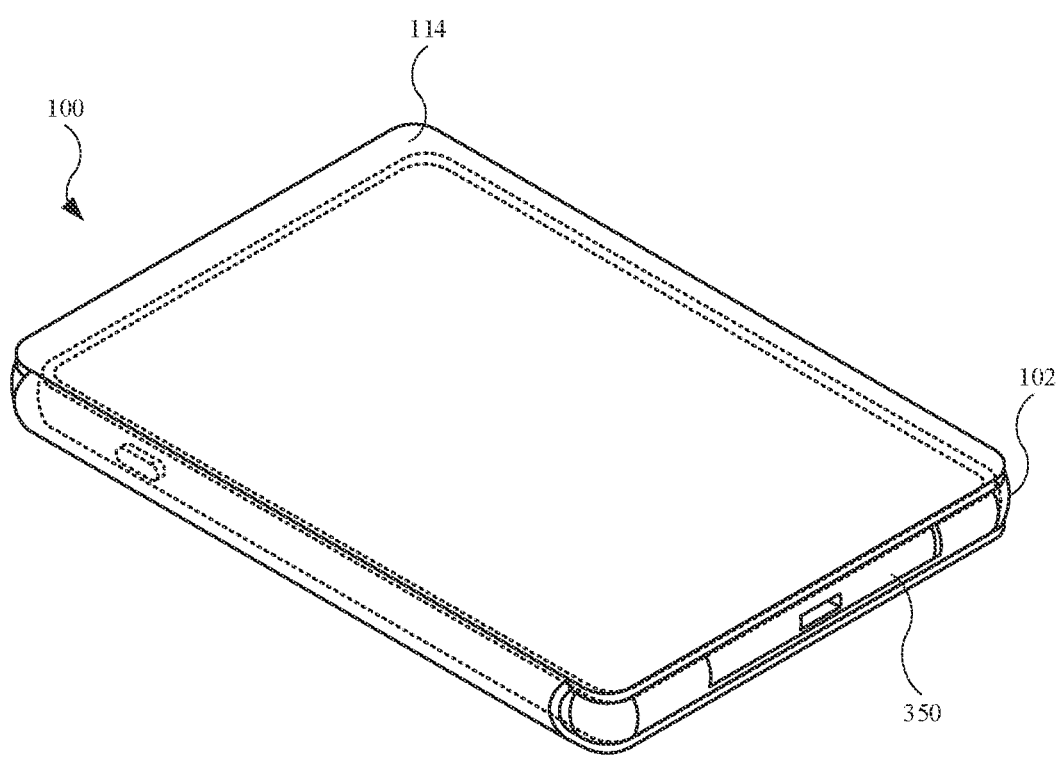
FIG. 5 illustrates an isometric view of the electronic device and the accessory device shown in FIG. 4, showing the cover positioned over the electronic device and the receptacle.

FIG. 5 illustrates an isometric view of the electronic device 350 and the accessory device 100 shown in FIG. 4, showing the cover 114 positioned over the electronic device 350 and the receptacle 102. As shown, the accessory device 100 defines a closed position that provides additional protection to the electronic device 350.

FIGS. 6-16 show different features of accessory devices, including different hardware that may be integrated with an accessory device. It should be noted that that some features of the accessory devices shown and described in FIGS. 6-16 may be combined/integrated with other accessory devices described herein. Also, some features (such as wireless circuitry) of the accessory devices shown and described in FIGS. 6-16 may include any functionality associated with other accessory devices described herein. Furthermore, although some features are not explicitly shown, the accessory devices shown and described in FIGS. 6-16 may include feature shown and described in prior embodiments of an accessory device. Also, some accessory devices shown and described in FIGS. 6-16 include a cover and a hinge. However, in some embodiments, the cover and hinge can be removed.

Figure 6:
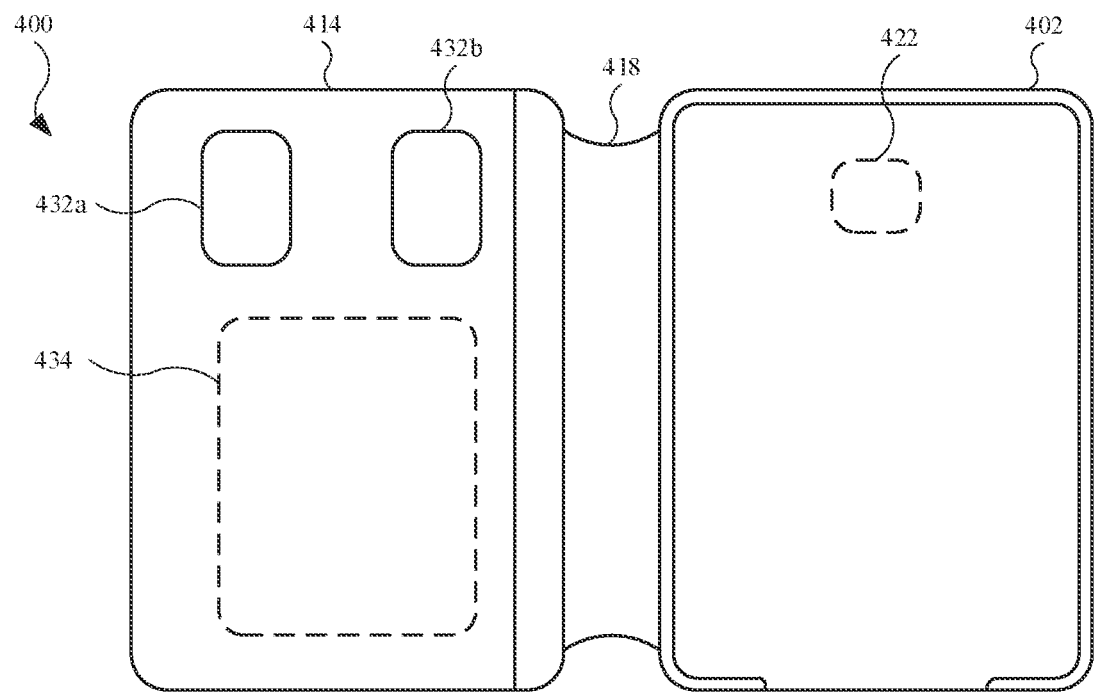
FIG. 6 illustrates a plan view of an alternate embodiment of an accessory device, showing the accessory device having sensors, in accordance with some described embodiments.

FIG. 6 illustrates a plan view of an alternate embodiment of an accessory device 400, showing the accessory device 400 having sensors, in accordance with some described embodiments. As shown, the accessory device 400 includes a receptacle 402 for an electronic device (not shown in FIG. 6) and a cover 414 connected to the receptacle 402 by a hinge 418. The cover 414 includes a sensor 432*a* and a sensor 432*b*. In some embodiments, the sensor 432*a* includes a UV sensor designed to detect UV radiation, including intensity of the UV radiation that is incident on the accessory device 400. In some embodiments, the sensor 432*b* includes a temperature sensor that determines instantaneous temperature at the accessory device 400. Sensors integrated with the accessory device 400 may take other forms, such as anemometers and magnetometers (for a compass), as non-limiting examples.

The accessory device 400 includes wireless circuitry 422 designed to receive information from the sensor 432*a* and the sensor 432*b*. In other words, the sensor 432*a* and the sensor 432*b* can transmit input information to the wireless circuitry 422. The wireless circuitry 422 can transmit the information provided by the sensor 432*a* and the sensor 432*b* to an electronic device (not shown in FIG. 6). The electronic device can subsequently present information associated with the information provided by the sensor 432*a* and the sensor 432*b* on a display assembly of the electronic device for a user to view, along with suggested information to the user based on the respective information provided by the sensor 432*a* and the sensor 432*b*. For example, when the sensor 432*a* is a UV sensor, the display assembly of the electronic device can present the UV intensity information and suggest the user wear additional clothing as protection from the UV light. When the sensor 432*b* is a temperature sensor, the display assembly of the electronic device can present the temperature information and the user can respond to the temperature information in a desired manner.

The accessory device 400 may further include an internal power supply 434. The internal power supply 434 may receive power from an electronic device (not shown in FIG. 6) that is positioned in the receptacle 402, and provide the power to operational components of the accessory device 400. Further, the internal power supply 434 may receive power from an external source (not shown in FIG. 6), such as an inductive charging station or a plug-in charging mechanism, and store the power in order to subsequently provide the power to an electronic device positioned in the receptacle 402. The internal power supply 434 may include a fixed power supply in the accessory device 400 or a removable power supply. Regarding the latter, the internal power supply 434 can be removed and substituted with a fully charged internal power supply (not shown in FIG. 6). This may overcome an issue of a user having to wait for the internal power supply 434 to charge.

Figure 7:
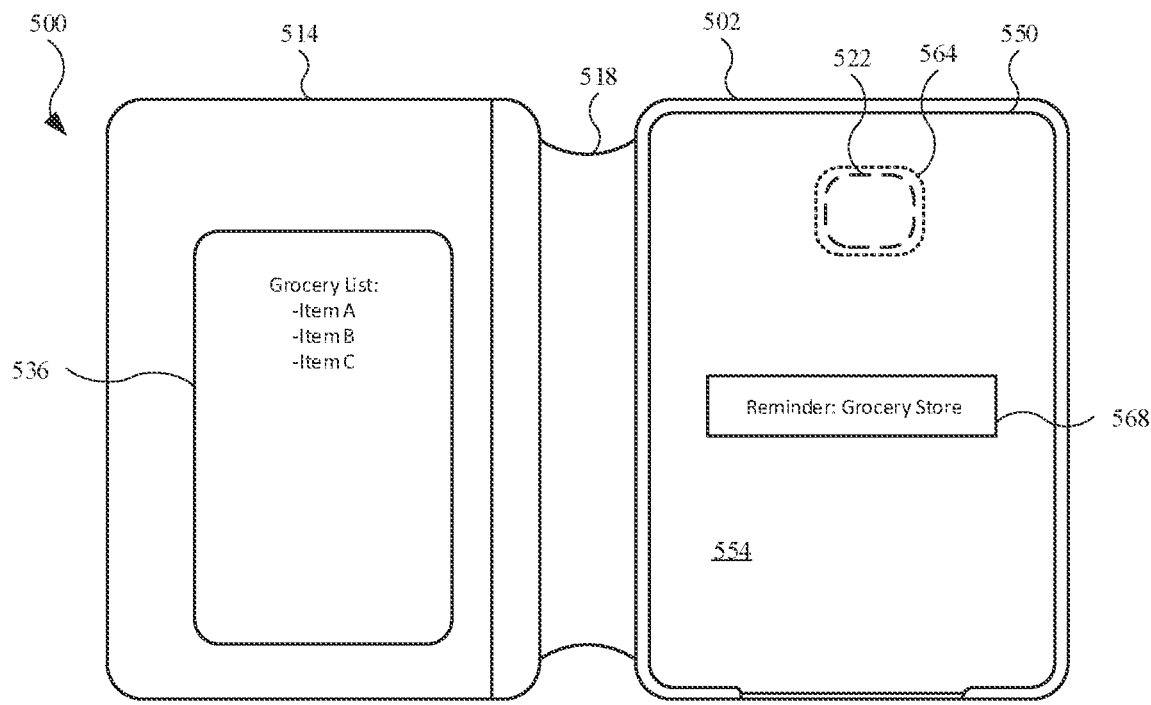
FIG. 7 illustrates a plan view of an alternate embodiment of an accessory device, showing the accessory device having a display, in accordance with some described embodiments.

FIG. 7 illustrates a plan view of an alternate embodiment of an accessory device 500, showing the accessory device 500 having a display 536, in accordance with some described embodiments. As shown, the accessory device 500 includes a receptacle 502 for an electronic device (not shown in FIG. 7) and a cover 514 connected to the receptacle by a hinge 518. The display 536 is located on the cover 514. The display 536 can include a touch input display. The accessory device 500 further includes wireless circuitry 522 that is in communication with the display 536 via processing circuitry (not shown in FIG. 7) of the accessory device 500. Also, an electronic device 550 is positioned in the receptacle 502. The electronic device 550 includes wireless circuitry 564 that can provide information to, and receive information from, the wireless circuitry 522 of the accessory device 500, in a manner similar to the previously described examples.

In some instances, the wireless circuitry 522 receives information from the wireless circuitry 564 and subsequently provides the information to the display 536. As an example shown in FIG. 7, the electronic device 550 includes a display assembly 554 capable of presenting a message 568 on the display assembly 554. As shown, message 568 includes a reminder that reminds a user to go to the grocery store. When the user provides the electronic device 550 with a list of grocery items stored on memory (either physical memory in the electronic device 550 or on a cloud-based network), the electronic device 550 can use the wireless circuitry 564 to transmit the grocery list information to the wireless circuitry 522. The information can be transmitted by the wireless circuitry 522 to the display 536 of the accessory device 500, and the display 536 can present the grocery list.

The display 536 of the accessory device 500 can provide several advantages. For example, in some instances, the display 536 includes an ink-based display that can present the information and subsequently transition to an inactive mode, while still presenting the information, in order to conserve power. As a result, a user need not access the display assembly 554 of the electronic device 550, which is known to draw significantly more power than the display 536.

Figure 8:
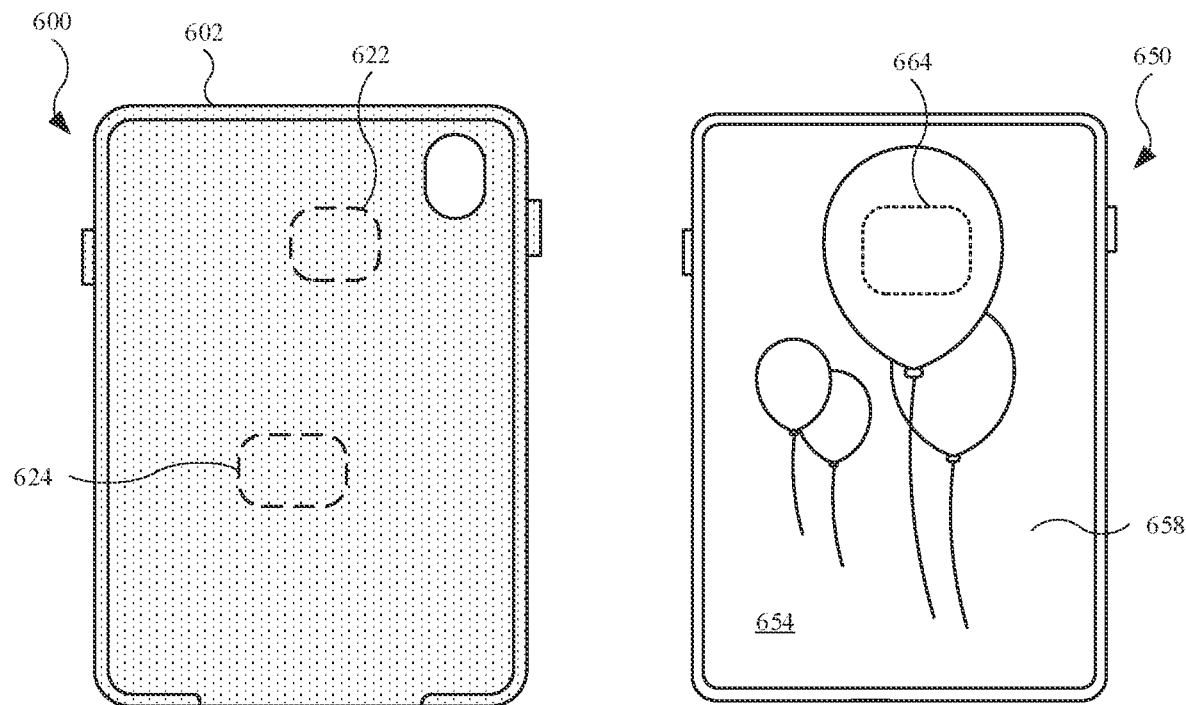
FIG. 8 illustrates a plan view of an embodiment of an accessory device and an electronic device that is compatible with the accessory device, in accordance with some described embodiments.

FIG. 8 illustrates a plan view of an embodiment of an accessory device 600 and an electronic device 650 that is compatible with the accessory device 600, in accordance with some described embodiments. As shown, the accessory device 600 may include a receptacle 602 that receives the electronic device 650. The accessory device 600 further includes wireless circuitry 622 that can communicate with wireless circuitry 664 of the electronic device 650.

The accessory device 600 is shaded to denote a particular appearance. For instance, the shading of the accessory device 600 denotes a color of the accessory device 600, as a non-limiting example. The appearance information may be stored on a memory circuit 624 that can be accessed by the wireless circuitry 622. Also, the electronic device 650 may include a display assembly 654 that is capable of present an image 658 on the display assembly 654. The image 658 may include multiple different colors in the spectrum of visible light.

Figure 9:
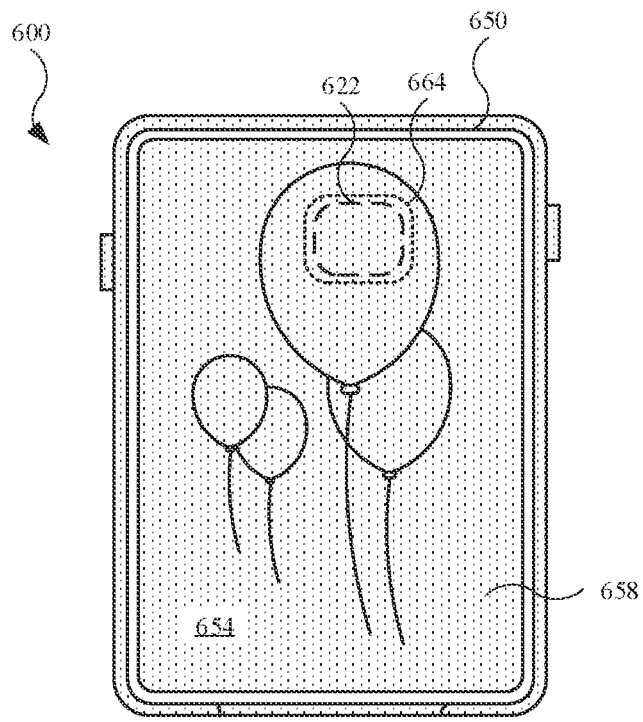
FIG. 9 illustrates a plan view of the accessory device and the electronic device shown in FIG. 8, showing the electronic device positioned in the accessory device.

FIG. 9 illustrates a plan view of the accessory device 600 and the electronic device 650 shown in FIG. 8, showing the electronic device 650 positioned in the accessory device 600. When positioned in the accessory device 600, the electronic device 650 can be placed in communication with the accessory device 600. In particular, the wireless circuitry 622 of the accessory device 600 is in communication with the wireless circuitry 664 of the electronic device 650. As a result, the wireless circuitry 622 may transmit information related to the accessory device 600, such as the appearance of the accessory device 600. In FIG. 9, the appearance information includes the color of the accessory device 600. The electronic device 650 can alter the display assembly 654 by providing a filter to the image 658 presented on the display assembly 654, thereby altering the appearance (i.e., color) of the image 658. As a result, the appearance of the image 658 matches, or at least partially matches, the appearance of the accessory device 600 in terms of color. Moreover, while the original color scheme of the image 658 at least partially remains, the applied filter may tint the image 658 to include a color similar to that of the accessory device 600.

In addition to providing information related to the appearance of the accessory device 600, additional features are possible. For example, in some embodiments, the accessory device 600 includes information stored on the memory circuit 624 associated with a particular theme. The theme may include a user-preferred theme, such as a sport franchise, a college or university, or a particular location of interest, as non-limiting examples. In this regard, when the electronic device 650 is positioned in the accessory device 600, information related to that particular theme can be transmitted to the electronic device 650 and presented on the display assembly 654. For example, when theme is related to a sports franchise, the sport franchise information is transmitted from the accessory device 600 to the electronic device 650. The electronic device 650 may use the sports franchise information to download customized information from a network (such as the Internet) and provide the customized information—such as the sports franchise's schedule, current opponent, current score, and/or statistical information—and subsequently provide the customized information for presentation on the display assembly 654 and/or through a speaker module (not shown in FIGS. 8 and 9) of the electronic device 650. Accordingly, the accessory device 600 may be associated with one or more personal interests of the user.

In another embodiment, the accessory device 600, using the wireless circuitry 622, can retrieve specific information and store the specific information that can be accessed by a user. For example, the accessory device 600 may be purchased as a gift, with the intent that a recipient of the accessory device 600 becomes the user. The purchaser of the accessory device 600 can record and store a personal message (such as a birthday message), either on the accessory device 600 or on a cloud-based storage network. Then, when the recipient/user receives the accessory device 600 and installs the electronic device 650 (assumed to be owned by the recipient) in the receptacle 602, the accessory device 600 can initiate a process in which the recipient/user receives the personal message from the accessory device 600 or through the cloud-based storage network, depending on which medium the purchaser chose to store the personal message. The personalized message is subsequently presented on the display assembly 654 and/or through a speaker module (not shown in FIGS. 8 and 9) of the electronic device 650. Accordingly, the accessory device 600 can used to transmit person-to-person information generated by one person with the intent that the information is presented to another person.

Figure 10:
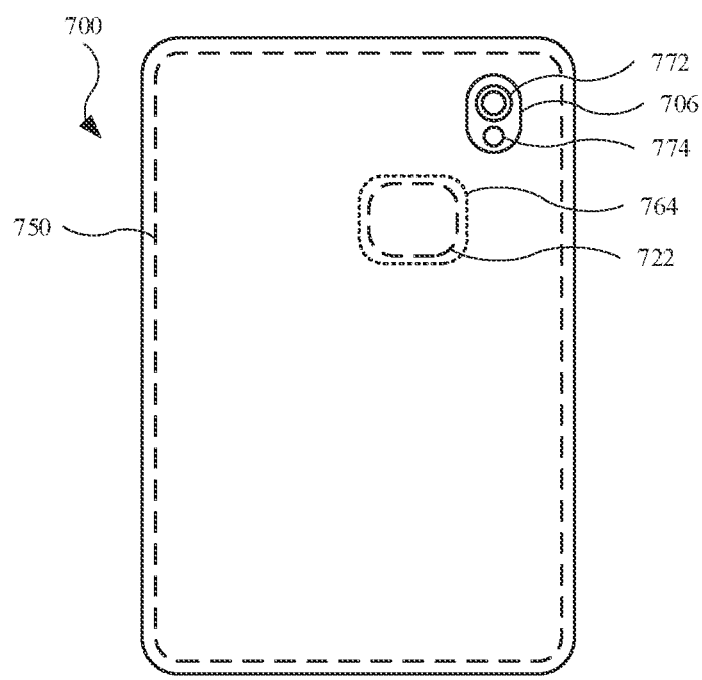
FIG. 10 illustrates a rear view of an embodiment of an electronic device positioned in an accessory device, in accordance with some described embodiments.

FIG. 10 illustrates a rear view of an electronic device 750 positioned in an accessory device 700, in accordance with some described embodiments. The electronic device 750 includes a camera module 772 designed to capture images, and also includes a flash module 774 that provides additional light during an image capture event by the camera module 772. The accessory device 700 includes an opening 706 for the camera module 772 and the flash module 774.

The accessory device 700 includes an appearance in terms of a color. In some instances during an image capture event, light provided by the flash module 774 reflects from an object (the image of which is captured by the camera module 772) toward the electronic device 750. However, the reflected light may also reflect off of the accessory device 700 prior to receipt by the camera module 772. When this occurs, the image may be distorted by imparting a color or tint to the image that matches the color of the accessory device 700.

Some structural changes can be implemented to accessory device 700 and the electronic device 750 to mitigate these issues. However, this requires engineering changes to the accessory device 700 and the electronic device 750. In order to overcome these image distortion issues and avoid design changes, the accessory device 700 may include wireless circuitry 722 in communication with wireless circuitry 764 in the electronic device 750. The wireless circuitry 722 may provide information to the wireless circuitry 764 that is related to the accessory device 700, such as the color and/or CIELAB color space values, which can be stored on a memory circuit (not shown in FIG. 10) of the accessory device 700. The information provided to the wireless circuitry 764 can subsequently be provided to processor circuitry (not shown in FIG. 10) of the electronic device 750. Using this information, the electronic device 750 can predict an amount of light absorption into the camera module 772 based on the color of the accessory device 700 and the light (initiated from the flash module 774) reflected from the accessory device 700 into the camera module 772. The electronic device 750 can run a software application (not shown in FIG. 10) that uses the predicted amount of light, and offsets or cancels the light absorption attributed to the accessory device 700. The offset/cancel feature may include color alterations to an image file that stores the image of the object captured by the camera module 772. Accordingly, the image distortion issues can be mitigated or prevented by means other than hardware design changes, while still using the flash module 774 of the electronic device 750.

Figure 11:
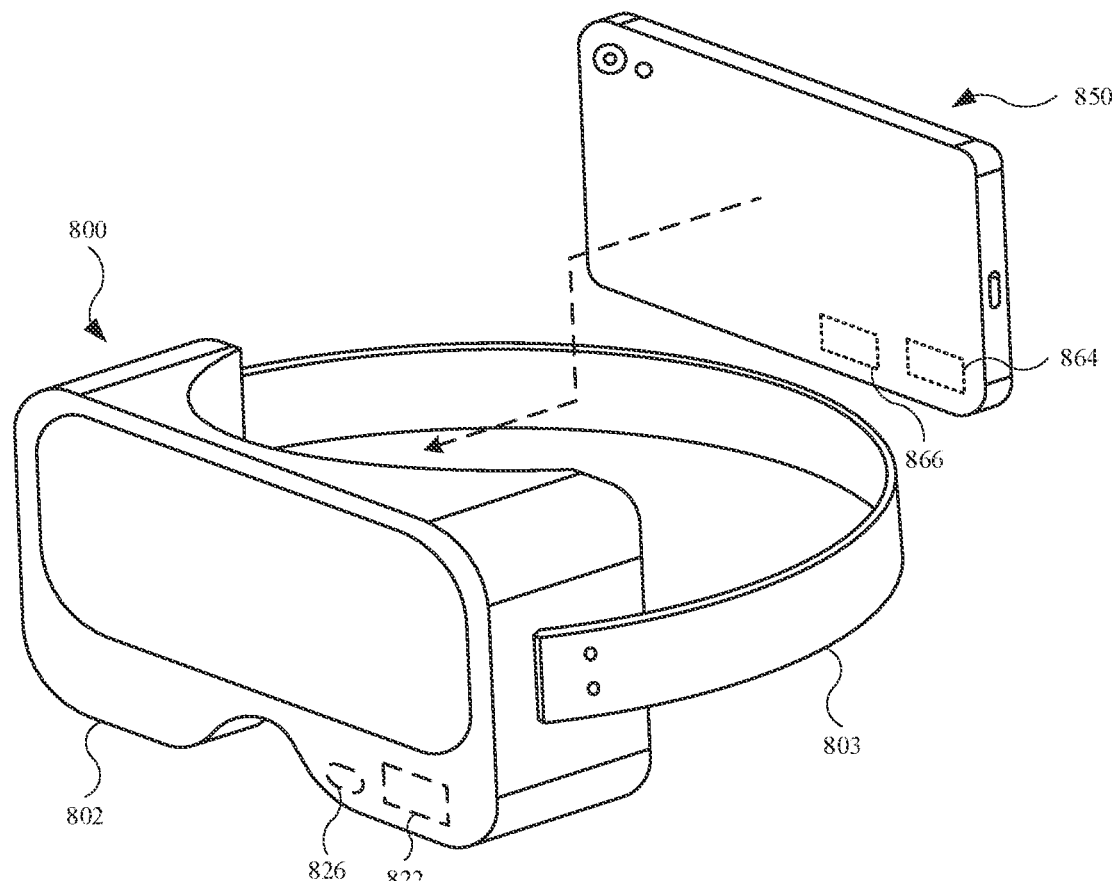
FIG. 11 illustrates an isometric view of an alternate embodiment of an accessory device that is compatible with an electronic device, in accordance with some described embodiments.

Accessory devices other than cases and folios may include wireless circuitry used to communicate with electronic devices. For example, FIG. 11 illustrates an isometric view of an alternate embodiment of an accessory device 800 that is compatible with an electronic device 850, in accordance with some described embodiments. As shown, the accessory device 800 may include a head mounted device that can take the form of a virtual reality headset or an augmented reality headset. As shown, the accessory device 800 includes a receptacle 802 that is designed to receive an electronic device 850. The accessory device 800 further includes a band 803 that can wrap around a user's head to secure the receptacle 802 (and the electronic device 850) with the user. The accessory device 800 further includes wireless circuitry 822 and a target 826. When the electronic device 850 is positioned in the receptacle 802, the target 826 can be detected by a detection mechanism 866, and communication can subsequently be established between the wireless circuitry 822 in the accessory device 800 and wireless circuitry 864 in the electronic device 850. Communication features previously described between accessory devices and electronic devices may occur between the accessory device 800 and the electronic device 850.

Figure 12:
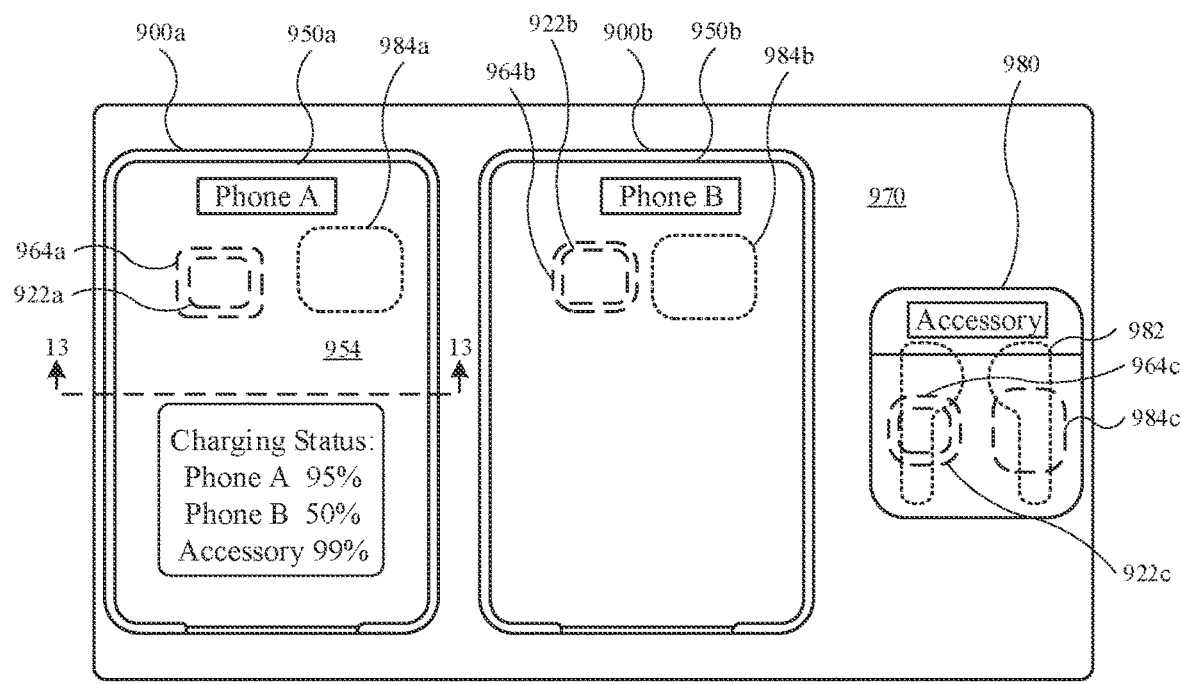
FIG. 12 illustrates a plan view of multiple devices positioned on a charging station, in accordance with some described embodiments.

FIG. 12 illustrates a plan view of multiple devices positioned on a charging station 970, in accordance with some described embodiments. The charging station 970 may include a wireless charging station with multiple inductive charging stations capable of inductively charging the multiple devices. As shown, an electronic device 950a ("Phone A"), an electronic device 950b ("Phone B"), and an accessory case 980 ("Accessory") are positioned on the charging station 970. The electronic device 950a and the electronic device 950b are positioned in an accessory device 900a and an accessory device 900b, respectively. The electronic devices and accessory devices may include features previously described for electronic devices and accessory devices, respectively. The accessory case 980 may include wireless earphones 982 (shown as dotted lines) positioned in an enclosure that is designed to inductively charge the wireless earphones 982.

Although not explicitly shown, the electronic device 950a, the electronic device 950b, and the accessory case 980 each include an inductive charging receiving coil. Also, although not explicitly shown, the charging station 970 includes inductive charging transmitting coils capable of inductively transferring electrical current to each of the respective inductive charging receiving coils the electronic device 950a, the electronic device 950b, and the accessory case 980 in order to provide inductive wireless charging to a respective battery located in the electronic device 950a, the electronic device 950b, and the accessory case 980.

The accessory device 900a, the accessory device 900b, and the accessory case 980 include wireless circuitry 922a, wireless circuitry 922b, and wireless circuitry 922c, respectively. Also, the electronic device 950a, the electronic device 950b, and the accessory case 980 include wireless circuitry 964a, wireless circuitry 964b, and wireless circuitry 964c capable of wireless communication with the wireless circuitry 922a, the wireless circuitry 922b, and the wireless circuitry 922c, respectively. Further, the charging station 970 may include wireless circuitry 984a, wireless circuitry 984b, and wireless circuitry 984c capable of wireless communication with the wireless circuitry 922a, the wireless circuitry 922b, and the wireless circuitry 922c, respectively. As a result, the charging station 970 may receive information from the accessory devices and the accessory case 980 and provide information to at least some of the devices, and the device with the received information may provide/present the received information on a display assembly of the device. For example, the wireless circuitry 922b of the accessory device 900b and the wireless circuitry 922c of the accessory case 980 can receive battery charge level information from respective batteries in the electronic device 950b and the accessory case 980 (and/or a battery in the wireless earphones 982), and transmit the battery charge level information to the wireless circuitry 984b and the wireless circuitry 984c, respectively, of the charging station 970. The wireless circuitry 984b and the wireless circuitry 984c can transmit the battery charge level information to the wireless circuitry 922a in the accessory device 900a, which in turn, can transmit the battery charge level information to the electronic device 950a via the wireless circuitry 964a. The electronic device 950a includes a display assembly 954 that can present the battery charge level information of a battery (not shown in FIG. 12) not only in the electronic device 950a, but also battery charge level information of a battery (not shown in FIG. 12) of the electronic device 950b and in the wireless earphones 982. Although not shown, the display assembly 954 can present the battery charge level information of a battery (not shown in FIG. 12) in the wireless earphones 982. Accordingly, the charging station 970 provides and promotes wireless communication between devices located on, and inductively charged by, the charging station 970.

Figure 13:
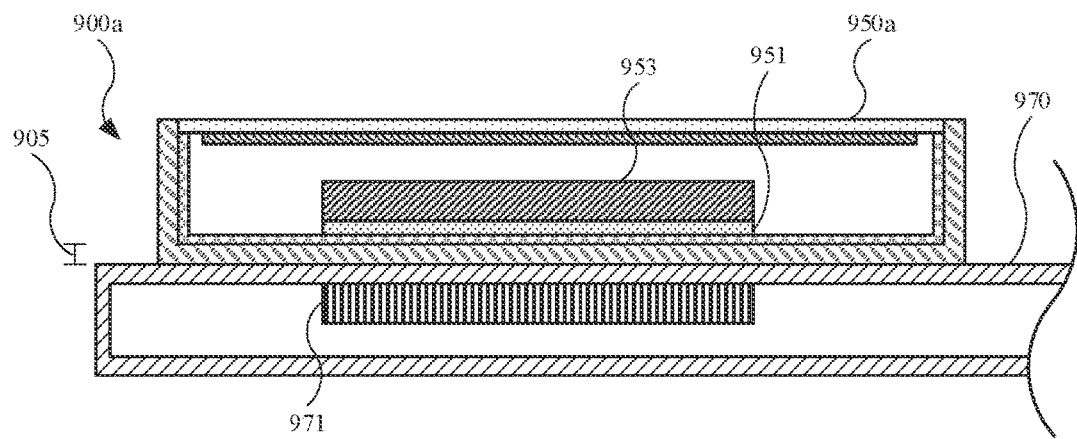
FIG. 13 illustrates a cross sectional view of the electronic device and the charging shown in FIG. 12, taken along line 13-13, showing dimensional information of the accessory device.

FIG. 13 illustrates a cross sectional view of the electronic device 950a and the charging station 970 shown in FIG. 12, taken along line 13-13, showing dimensional information of the accessory device 900a. As shown, the accessory device 900a may include a dimension 905 associated with a thickness of the accessory device 900a. The thickness information (defined by the dimension 905) may be transmitted from the wireless circuitry 922a (shown in FIG. 12) of the accessory device 900a to the wireless circuitry 984a (shown in FIG. 12) of the charging station 970. The charging station 970 may use the thickness information to adjust the power transmitted by an inductive charging transmitter coil 971 in the charging station 970 in order to ensure adequate power is transmitted by the inductive charging transmitter coil 971 to an inductive charging receiver coil 951 in the electronic device 950a. The inductive charging receiver coil 951 used to provide power to an internal power supply 953, or battery, of the electronic device 950a. The charging station 970 may increase or decrease the transmitted power by the inductive charging transmitter coil 971 based on the dimension 905 to not only ensure adequate power transmission but also to limit unnecessary/excessive power transmission.

Figure 14:
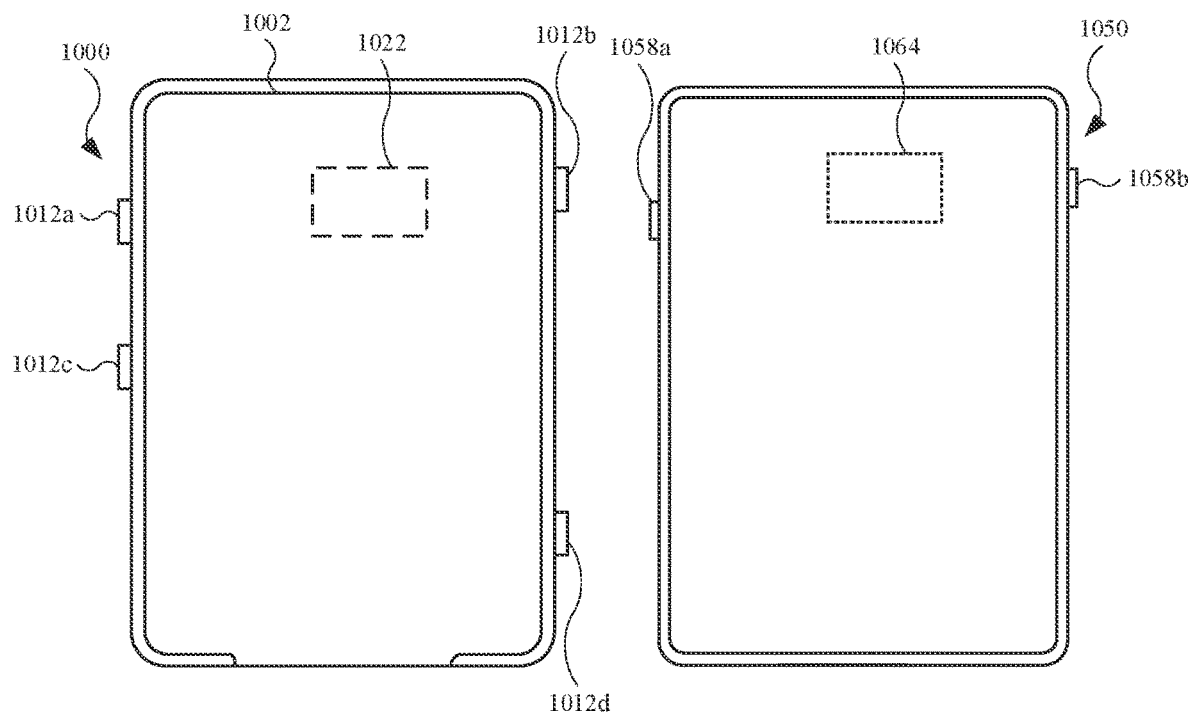
FIG. 14 illustrates a plan view of an embodiment of an accessory device and an electronic device that is compatible with the accessory device, in accordance with some described embodiments.

FIG. 14 illustrates a plan view of an embodiment of an accessory device 1000 and an electronic device 1050 that is compatible with the accessory device 1000, in accordance with some described embodiments. As shown, the accessory device 1000 includes a receptacle 1002 than can receive the electronic device 1050. Also, the accessory device 1000 includes wireless circuitry 1022, and the electronic device 1050 includes wireless circuitry 1064 capable of wireless communication with the wireless circuitry 1022 when the electronic device 1050 is positioned in the receptacle 1002.

The electronic device 1050 includes a button 1058a and a button 1058b. Each of the buttons, when depressed, allows a user to provide an input to the electronic device 1050. The accessory device 1000 includes a button 1012a and a button 1012b that can be depressed to actuate the button 1058a and the button 1058b, respectively, when the electronic device 1050 is positioned in the receptacle 1002. The accessory device 1000 may include additional buttons, such as a button 1012c and a button 1012d. While the button 1012a and the button 1012b of the accessory device 1000 correspond to the button 1058a and the button 1058b, respectively, of the electronic device 1050, the button 1012c and the button 1012d do not correspond to any additional buttons of the electronic device 1050.

The button 1012c and the button 1012d of the accessory device 1000 can nonetheless be depressed and provide an input to the electronic device 1050 by passing information to the wireless circuitry 1022, which in turn provide the information over wireless communication with the wireless circuitry 1064. The button 1012c and the button 1012d can be pre-programmed to provide specific user inputs, such as activating a camera module (not shown in FIG. 14) of the electronic device 1050 to capture an image, as a non-limiting example. Alternatively, the button 1012c and/or the button 1012d may be programmed by a user to provide flexibility in terms of functionality. Regarding the latter, the programming may be communicated between the electronic device 1050 and the accessory device 1000 by way of their respective wireless circuitry. It should be noted that the button 1012c and the button 1012d may be in communication with the wireless circuitry 1022 by, for example, flexible circuitry (not shown in FIG. 14) that is embedded in the accessory device 1000.

Figure 15:
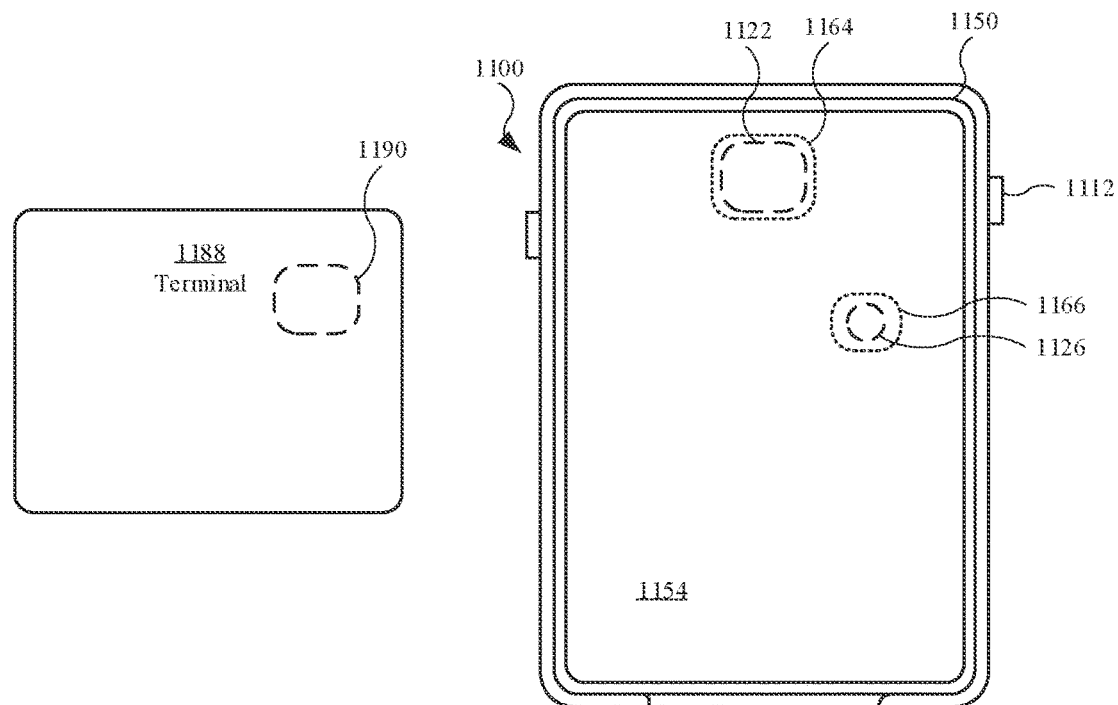
FIG. 15 illustrates a plan view of an embodiment of an accessory device and an electronic device positioned in the accessory device, showing the electronic device in communication with a terminal, in accordance with some described embodiments.

FIG. 15 illustrates a plan view of an accessory device 1100 and an electronic device 1150 positioned in the accessory device 1100, showing the electronic device in communication with a terminal 1188, in accordance with some described embodiments. As shown, the accessory device 1100 includes a receptacle (not labeled) that receives the electronic device 1150. Also, the accessory device 1100 includes wireless circuitry 1122, and the electronic device 1150 includes wireless circuitry 1164 that can communicate with the wireless circuitry 1122 when the electronic device 1150 is positioned in the receptacle. Also, the accessory device 1100 may include a target 1126 that can be detected by a detection mechanism 1166 located in the electronic device 1150. In some instances, detection of the target 1126 by the detection mechanism 1166 provides at least some form of authentication, or at least some determination that the accessory device 1100 is an authorized accessory device for use with the electronic device 1150. Also, in instances when the wireless circuitry 1122 is inactive, the detection mechanism 1166 may provide an input signal, when the target 1126 is detected, to the electronic device 1150, which in turn causes the electronic device 1150 to signal to the wireless circuitry 1164 to provide an activation, or "wake," command to the wireless circuitry 1122.

In some embodiments, the terminal 1188 includes a payment terminal used for processing payment transactions. However, it should be noted that the terminal 1188 may include other forms of wireless communication terminals. In these embodiments, the electronic device 1150, using the wireless circuitry 1164, is capable of performing a wireless payment transaction with the terminal 1188, as the terminal 1188 include wireless circuitry 1190. In some instances, however, certain wireless payment protocols do not permit a payment transaction when the terminal 1188 detects wireless communication from more than one wireless circuit a time. This may occur unintentionally when, for example, both the wireless circuitry 1122 and the wireless circuitry 1164 each provide wireless commination that is detected by the terminal 1188. This may result in the cancellation of the wireless payment transaction between the electronic device 1150 and the terminal 1188.

In order to overcome this issue, the wireless circuitry 1122 can be selectively deactivated through communication from the wireless circuitry 1164 initiated by the electronic device 1150. The initiation by the electronic device 1150 may occur automatically when the electronic device 1150 is in a "payment mode," in which the electronic device 1150 is attempting to perform a wireless payment transaction with the terminal 1188. Alternatively, a user of the electronic device 1150 and accessory device 1100 may initiate a deactivation command by depressing a button 1112 of the accessory device 1100, corresponding to a depression of a button (not shown in FIG. 15) of the electronic device 1150. Alternatively, a user can depress a display assembly 1154 (corresponding to a touch input to the display assembly 1154 that is detectable by the display assembly 1154) to initiate deactivation of the wireless circuitry 1122. Either process can deactivate the wireless circuitry 1122 of the accessory device 1100 in order for the wireless circuitry 1164 of the electronic device 1150 to perform a wireless payment transaction with the terminal 1188. Accordingly, the wireless circuitry 1122 of the accessory device 1100 can be selectively deactivated in order to comply with established wireless standards and protocols.

Figure 16:
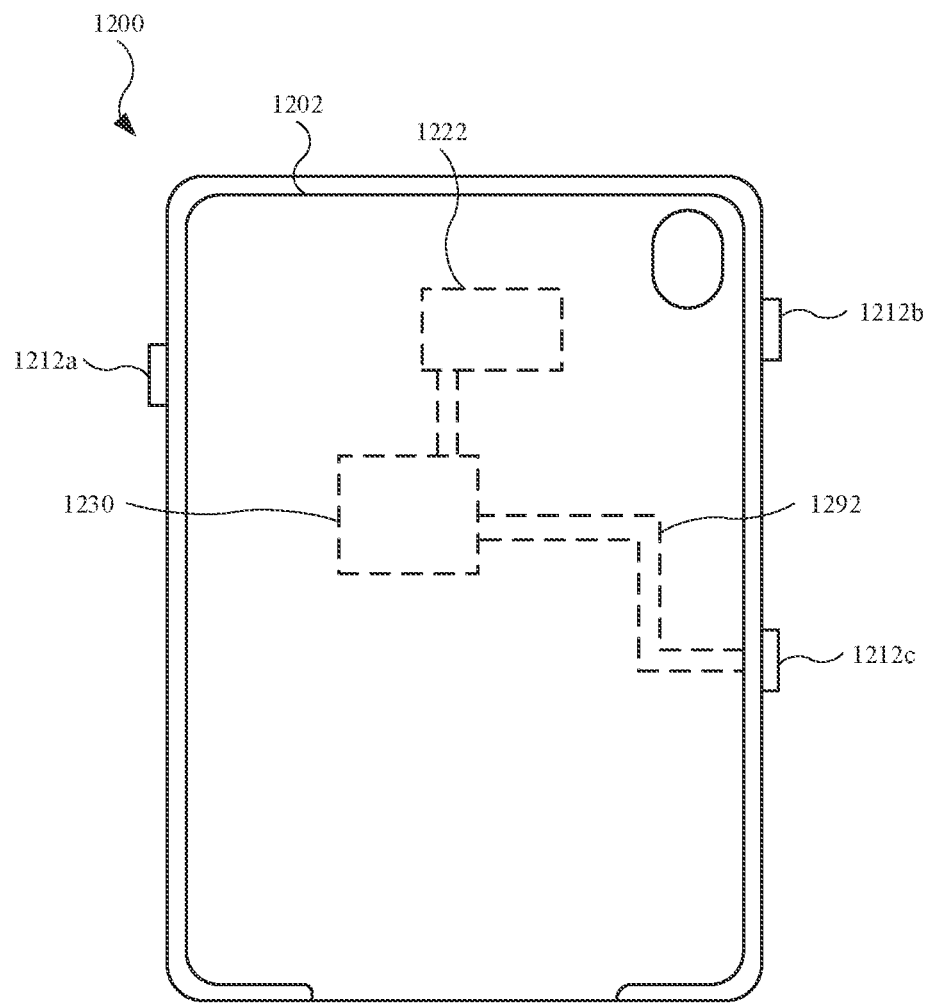
FIG. 16 illustrates a plan view of an embodiment of an accessory device, showing the accessory device with wireless circuitry that can be selectively activated and deactivated by a button of the accessory device, in accordance with some described embodiments.

FIG. 16 illustrates a plan view of an embodiment of an accessory device 1200, showing the accessory device 1200 with wireless circuitry 1222 that can be selectively activated and deactivated by a button of the accessory device 1200, in accordance with some described embodiments. As shown, the accessory device 1200 includes a receptacle 1202 that can receive an electronic device (not shown in FIG. 16). The accessory device 1200 further includes a button 1212a and a button 1212b that can be depressed in order to depress a respective button (not shown in FIG. 16) of an electronic device.

The accessory device 1200 further includes a button 1212c in communication with the wireless circuitry 1222 by way of flexible circuitry 1292 that is embedded in the accessory device 1200. The button 1212c can be used to selectively activate or deactivate the wireless circuitry 1222. For example, the button 1212c can be depressed to send an input signal to a controller 1230 (with necessary executable software and/or algorithms), which in turn, activates the wireless circuitry 1222 when the wireless circuitry 1222 is inactive, or deactivates the wireless circuitry 1222 when the wireless circuitry 1222 is active. Accordingly, the accessory device 1200 may include internal hardware and software that can control the wireless circuitry 1222.

Figure 17:
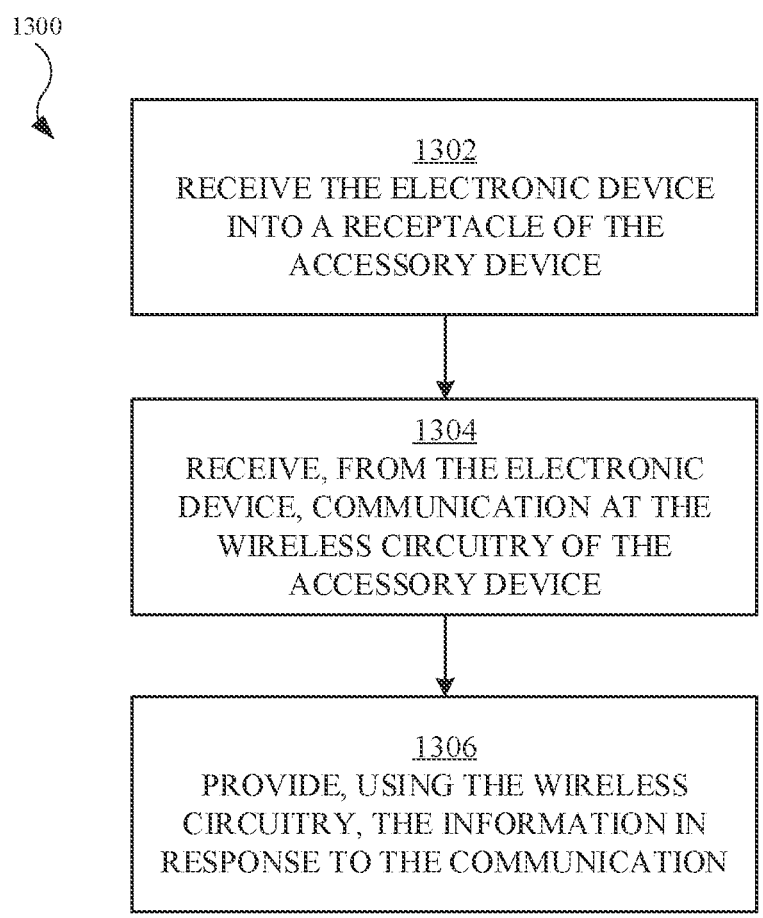
FIG. 17 illustrates a flowchart showing a method for altering an electronic device using an accessory device, in accordance with some described embodiments.

FIG. 17 illustrates a flowchart 1300 showing a method for communicating with an electronic device using an accessory device, in accordance with some described embodiments. The processes in the flowchart 1300 indicated as being carried out by the accessory device can be carried out other accessory devices described herein.

In step 1302, the electronic device is received by the accessory device. For example, the electronic device can be received by the accessory device by positioning the electronic device a receptacle of the accessory device. The receptacle may carry wireless circuitry and a memory circuit that stores information in accordance with the accessory device. In some embodiments, the accessory device includes a folio having both a receptacle and a cover. In these embodiments, the wireless circuitry and the memory circuit may be carried by the receptacle or the cover. Further, when the accessory device includes a folio, one of the wireless circuit and the may be carried by the receptacle and the remaining component may be carried by the cover.

In step 1304, the accessory device receives communication, from the electronic device, communication at the wireless circuitry. The communication may include an authentication request that requires (by the electronic device) the accessory device to identify itself to the electronic device.

In step 1306, the accessory device provides, using the wireless circuitry, the information in response to the communication. The information may can be stored on the memory circuit, and may include authentication information, such as a validation key (as a non-limiting example). Once the accessory device is validated, the accessory device may provide additional information (stored on the memory circuit) to the electronic device, such as serial information (corresponding to the type of accessory device) or appearance (such as color and/or material of the electronic device), as non-limiting examples. In some embodiments, the validation step is not required.

Figure 18:
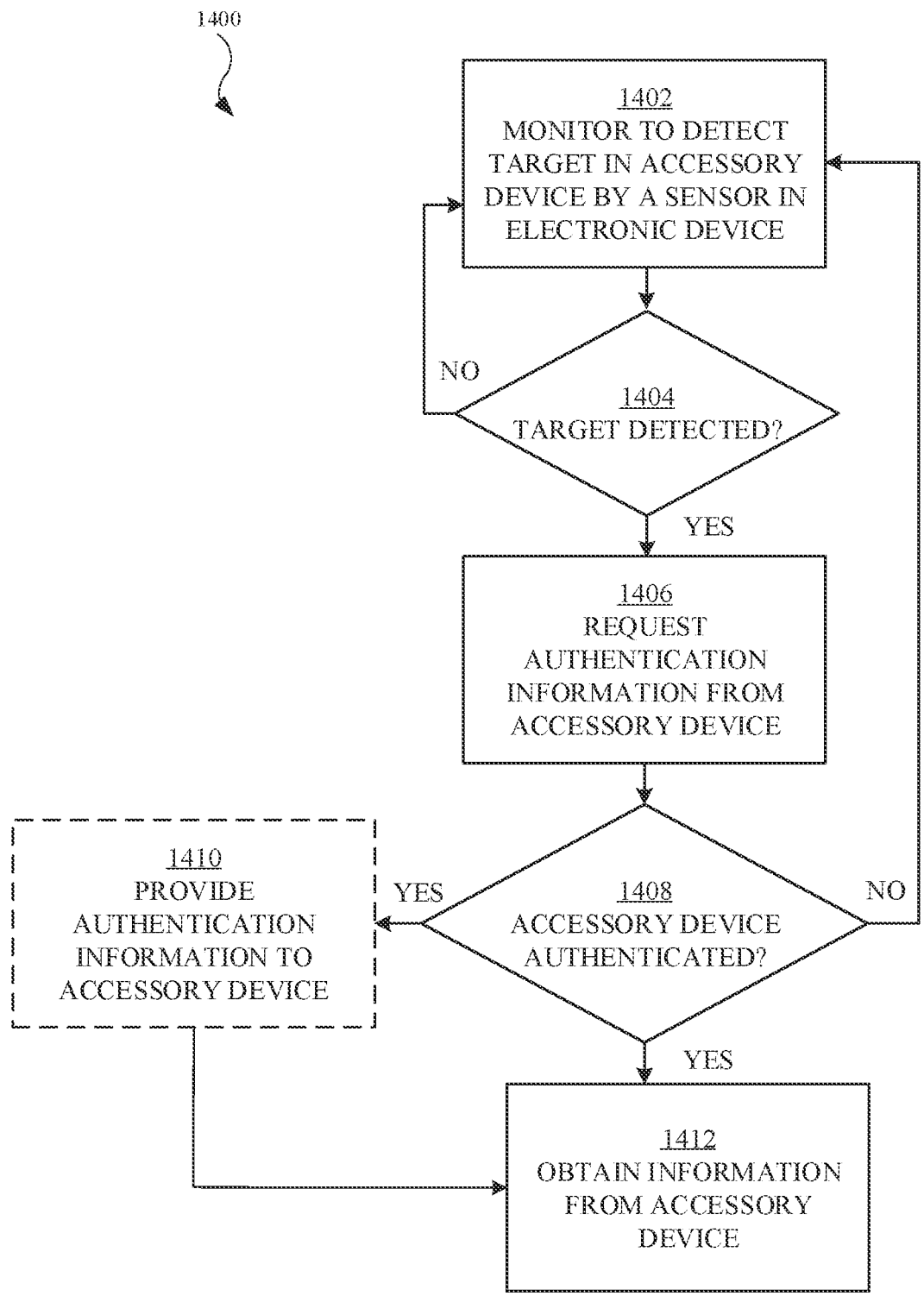
FIG. 18 illustrates a flowchart showing a method for interacting with an accessory device using an electronic device, in accordance with some described embodiments.

FIG. 18 illustrates a flowchart 1400 showing a method for interacting with an accessory device using an electronic device, in accordance with some described embodiments. In step 1402, the electronic device can monitor for a target in the accessory device. The target may include a magnet, or some other component (active or passive) that emits a detectable feature(s). Also, when the target includes a magnet, the sensor may include a magnetic field sensor.

At step 1404, a determination is made whether the target is detected. When the sensor detects the target, the electronic device is positioned in a receptacle of the accessory device.

In step 1406, the electronic device can provide an authentication request to the accessory device. As an example, the electronic device may include wireless circuitry that provides wireless communication to wireless circuitry in the accessory device. Also, the wireless communication protocol may include NFC protocols, as a non-limiting example. When the authentication request from the electronic device is provided to the accessory device, the accessory device may then respond, using wireless circuitry, with a validation response to the electronic device.

In step 1408, a decision is made, by the electronic device, whether the accessory device is authenticated. If the validation response provided by the accessory device is determined not to be authentic, the flowchart 1400 returns to step 1402. If, on the other hand, the validation response provided by the accessory device is determined to be authentic, the accessory device can be validated by the electronic device and the process can continue to step 1410 (an optional step) or directly to step 1412.

In step 1410, an optional step, subsequent to the electronic device determining the accessory device is authentic, the accessory device subsequently can provide an authentication request to the electronic device, by way of the wireless circuitry in the respective devices. When the authentication request from the accessory device is provided to the electronic device, the electronic device may then respond, using wireless circuitry, by providing authentication information that includes a validation response to the accessory device. If the validation response provided by the electronic device is determined to be authentic, the process can continue to step 1412.

Step 1410 can define, in part, a mutual authentication process in which the electronic device and the accessory device can validate each other. While in some instance a single authentication step from the electronic device to the accessory device may limit or prevent use of a counterfeit or otherwise unauthorized accessory device, the addition of step 1410 can provide additional security and privacy. Mutual authentication requires that the accessory device must perform not only a validation response, but must also have its own hardware and software to provide an authentication. Further, the mutual authentication also provides an added step of ensuring the electronic device and the accessory device are compatible with each other, and are approved devices.

In step 1412, the electronic device obtains information from the accessory device. As non-limiting examples, the information may include characteristics of the accessory device, such as the color, material(s), reflective properties of the material(s), and whether the accessory device includes a cover. In addition, the accessory device may store information related a theme, hobby, or something of particular interest to a user. This information can also be transmitted to the electronic device. By obtaining the information from the accessory device, the electronic device performs several operations. For example, when the electronic device receives color information pertaining to the accessory device, the electronic device can apply a filter to a display assembly of the electronic device, with the filter altering an appearance of an image presented by the display assembly to include a color that matches the color of the accessory device. In another example, when the electronic device receives the reflective properties of the material and the color information (of the accessory device), the electronic device can predict, using the processing circuitry, the color absorption into a camera module of the electronic device from the accessory device. The predicted amount of light can be used by a software application capable of offsetting light absorption issues related to the appearance/color of the accessory device. In yet another example, when accessory device provides information related to a theme, the theme information is transmitted from the accessory device to the electronic device. The electronic device may use the theme information to download from a network (such as the Internet) and provide customized information related to the theme, and subsequently present on customized information on the display assembly and/or through a speaker module of the electronic device. In yet another example, when accessory device provides information related to a stored message (e.g., customized message) by a person, the information is transmitted from the accessory device to the electronic device. The electronic device may subsequently present the customized message on the display assembly and/or through a speaker module of the electronic device.

Figure 19:
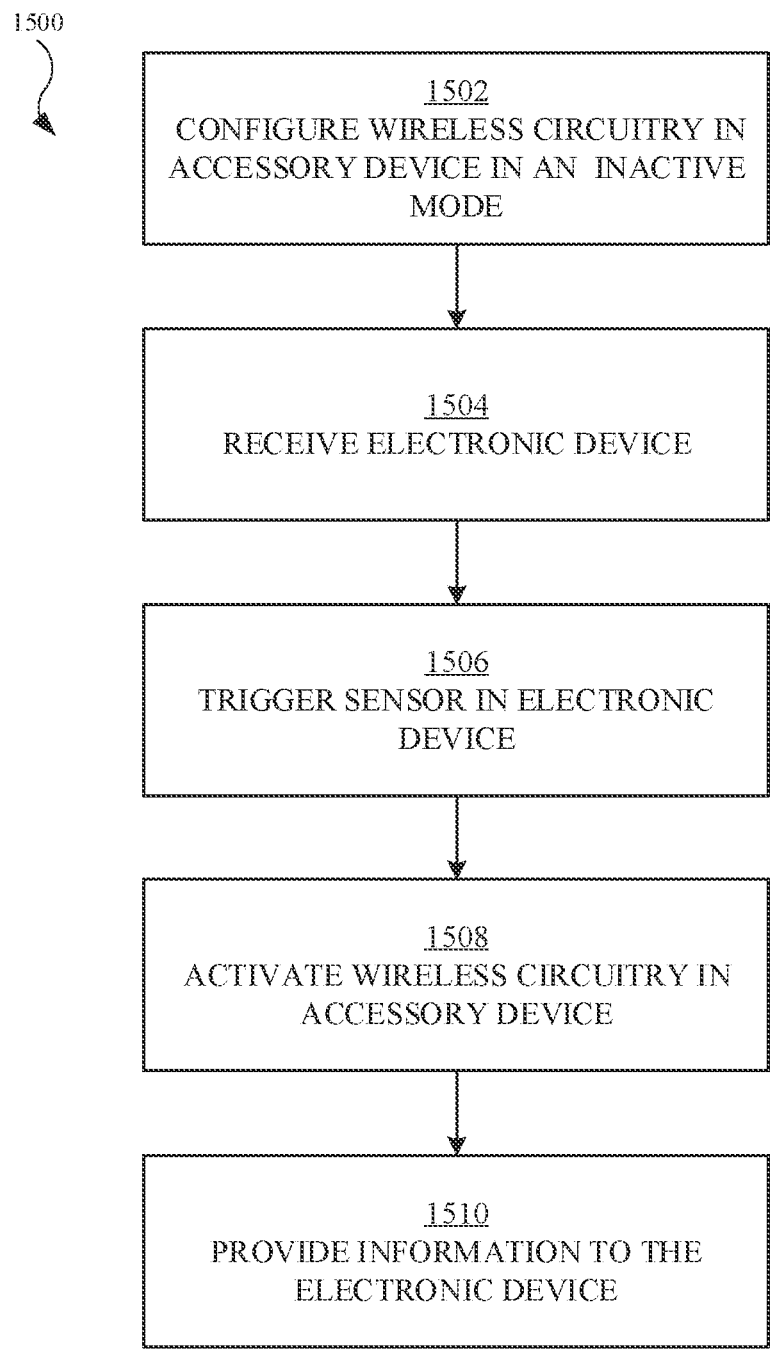
FIG. 19 illustrates a flowchart showing a method for activating wireless circuitry in an accessory device, in accordance with some described embodiments.

FIG. 19 illustrates a flowchart 1500 showing a method for activating wireless circuitry in an accessory device, in accordance with some described embodiments. The process steps in the flowchart 1500 indicated as being carried out by the electronic device and the accessory device can be carried out by electronic devices and the accessory devices, respectively, described herein.

In step 1502, the wireless circuitry in the accessory device is configured in an inactive mode. The configuration can be initiated by a manufacturer of the accessory device, or may include a user-initiated deactivation of the wireless circuitry.

In step 1504, the electronic device is received by the accessory device. The accessory device may include a receptacle that defines an internal volume having a size and shape in accordance with the electronic device, thereby allowing the electronic device to fit into the receptacle. The receptacle may further include a target, such as a magnet, that is detectable by a sensor, or detection mechanism, in the electronic device.

In step 1506, the sensor in the electronic device is triggered. In this regard, the target is detected by the sensor, and the sensor initiates the triggering event. The sensor may include a magnetic field sensor when the target in the accessory device includes a magnet.

In step 1508, the wireless circuitry in the accessory device is activated. The activation is based in part upon the sensor in the electronic device being triggered by detection of the target in the accessory device.

In step 1510, information associated with the accessory device is provided to the electronic device. This may be performed between wireless circuitry in the respective devices. As non-limiting examples, the information may include characteristics of the accessory device, such as the color, material(s), reflective properties of the material(s), and whether the accessory device includes a cover. In addition, the accessory device may store information related a theme, hobby, or something of particular interest to a user. This information can also be transmitted to the electronic device. By obtaining the information from the accessory device, the electronic device performs several operations. For example, when the electronic device receives color information pertaining to the accessory device, the electronic device can apply a filter to a display assembly of the electronic device, with the filter altering an appearance of an image presented by the display assembly to include a color that matches the color of the accessory device. In another example, when the electronic device receives the reflective properties of the material and the color information (of the accessory device), the electronic device can predict, using the processing circuitry, the color absorption into a camera module of the electronic device from the accessory device. The predicted amount of light can be used by a software application capable of offsetting light absorption issues related to the accessory device. In yet another example, when accessory device provides information related to a theme, the theme information is transmitted from the accessory device to the electronic device. The electronic device may use the theme information to download from a network (such as the Internet) and provide customized information related to the theme, and subsequently present the customized information on the display assembly and/or through a speaker module of the electronic device. In yet another example, when accessory device provides information related to a stored message (e.g., customized message) by a person, the information is transmitted from the accessory device to the electronic device. The electronic device may subsequently present the customized message on the display assembly and/or through a speaker module of the electronic device.

Figure 20:
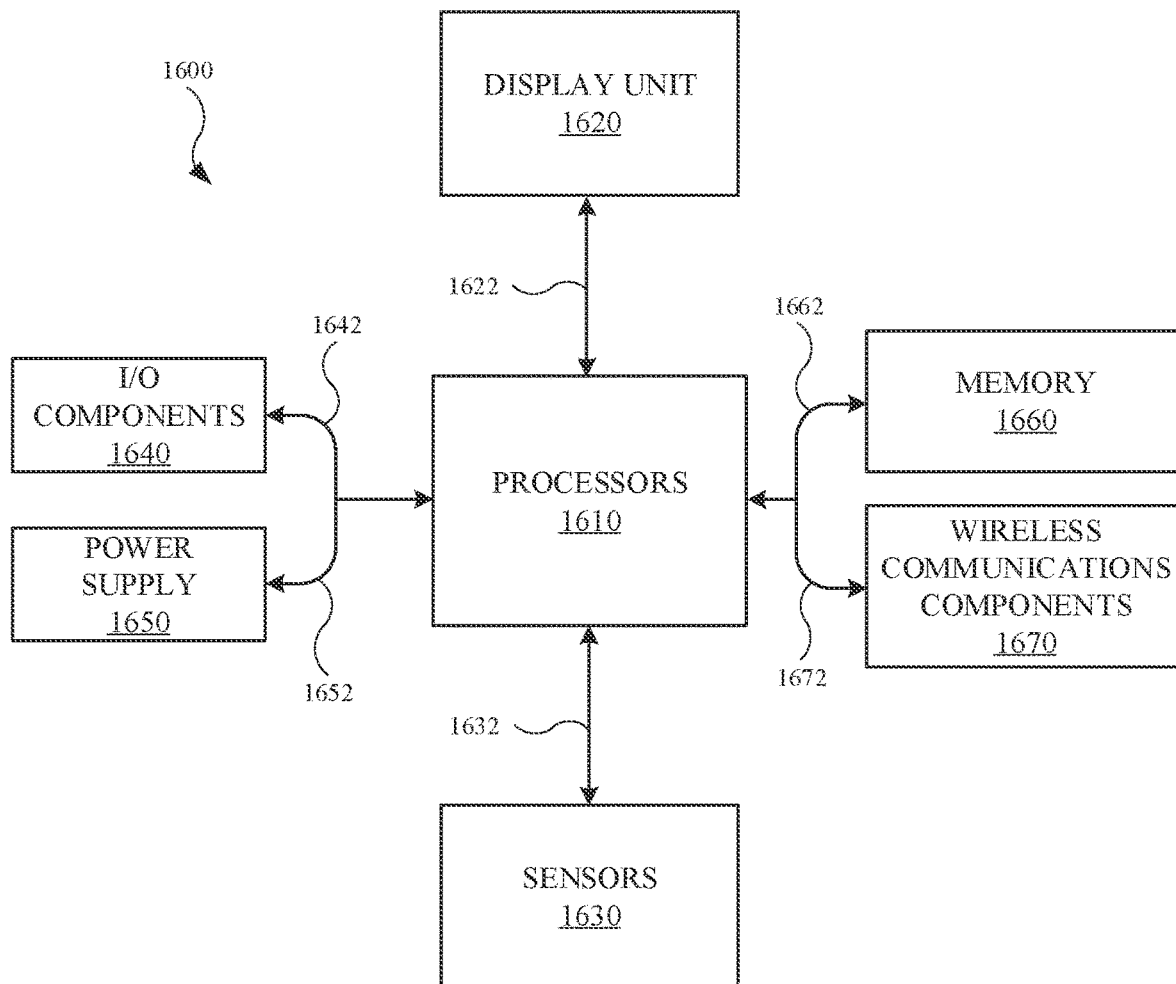
FIG. 20 illustrates a block diagram of an electronic device, in accordance with some described embodiments.

FIG. 20 illustrates a block diagram of an electronic device 1600, in accordance with some described embodiments. The features in the electronic device 1600 may be present in electronic devices described herein. The electronic device 1600 may include a portable electronic device, such as a mobile wireless communication device described herein. The electronic device 1600 may include one or more processors 1610 for executing functions of the electronic device 1600. The one or more processors 1610 can refer to at least one of a central processing unit (CPU) and at least one microcontroller for performing dedicated functions. Also, the one or more processors 1610 can refer to application specific integrated circuits.

According to some embodiments, the electronic device 1600 can include a display unit 1620. The display unit 1620 is capable of presenting a user interface that includes icons (representing software applications), textual images, and/or motion images. In some examples, each icon can be associated with a respective function that can be executed by the one or more processors 1610. In some cases, the display unit 1620 includes a display layer (not illustrated), which can include a liquid-crystal display (LCD), light-emitting diode display (LED), or the like. According to some embodiments, the display unit 1620 includes a touch input detection component and/or a force detection component that can be configured to detect changes in an electrical parameter (e.g., capacitance value) when the user's appendage (acting as a capacitor plate) comes into proximity with the display unit 1620 (or in contact with a transparent cover layer that covers the display unit 1620). The display unit 1620 is connected to the one or more processors 1610 via one or more connection cables 1622.

According to some embodiments, the electronic device 1600 can include one or more sensors 1630 capable of detecting an orientation of the electronic device 1600. In some examples, the one or more sensors 1630 may include an accelerometer, an electronic gyroscope, or some other orientation sensor. In some embodiments, the one or more sensors 1630 can determine whether the electronic device 1600 is positioned in a manner that a user can use certain features, such as an input mechanism of an accessory device (not shown in FIG. 20). In response, the one or more processors 1610 can modify a notification that activates the display unit 1620. The one or more sensors 1630 can also include magnetic field sensors, such as Hall Effect sensors. The one or more sensors 1630 is/are connected to the one or more processors 1610 via one or more connection cables 1632.

According to some embodiments, the electronic device 1600 can include one or more input/output components 1640 that enable communication between a user and the electronic device 1600. In some cases, the one or more input/output components 1640 can refer to a button or a switch that is capable of actuation by the user. In some examples, the one or more input/output components 1640 can refer to a switch having a mechanical actuator (e.g., spring-based switch, slide-switch, rocker switch, rotating dial, etc.) or other moving parts that enable the switch to be actuated by the user. When the one or more input/output components 1640 are used, the one or more input/output components 1640 can generate an electrical signal that is provided to the one or more processors 1610 via one or more connection cables 1642.

According to some embodiments, the electronic device 1600 can include a power supply 1650 that is capable of providing energy to the operational components of the electronic device 1600. In some examples, the power supply 1650 can refer to a rechargeable battery. The power supply 1650 can be connected to the one or more processors 1610 via one or more connection cables 1652. The power supply 1650 can be directly connected to other devices of the electronic device 1600, such as the one or more input/output components 1640. In some examples, the electronic device 1600 can receive power from another power source (e.g., an external charging device). Further, the power supply 1650 may include an inductive charging coil for receiving an induced current used to charge the power supply 1650.

According to some embodiments, the electronic device 1600 can include memory 1660, which can include a single disk or multiple disks (e.g., hard drives), and includes a storage management module that manages one or more partitions within the memory 1660. In some cases, the memory 1660 can include flash memory, semiconductor (solid state) memory, or the like. The memory 1660 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of the electronic device 1600. In some embodiments, the memory 1660 refers to a non-transitory computer readable medium, where an operating system ("OS") is established at the memory 1660 that can be configured to execute software applications. The one or more processors 1610 can also be used to execute software applications. In some embodiments, a data bus 1662 can facilitate data transfer between the memory 1660 and the one or more processors 1610.

According to some embodiments, the electronic device 1600 can include wireless communications components 1670. A network/bus interface 1672 can couple the wireless communications components 1670 to the one or more processors 1610. The wireless communications components 1670 can communicate with other electronic devices via any number of wireless communication protocols, including at least one of a global network (e.g., the Internet), a wide area network, a local area network, a wireless personal area network (WPAN), or the like. In some examples, the wireless communications components 1670 can communicate using NFC protocol. Similarly, an accessory device (not shown in FIG. 20) may include a wireless communications component that communicates, under NFC protocol, with the wireless communications components 1670.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device, comprising:
   a body that defines a receptacle configured to receive an electronic device, the body comprising:
      a bottom wall, and
      sidewalls extending from the bottom wall;
   a memory circuit stored in the body, the memory circuit storing data; and
   wireless circuitry carried by the body, wherein in response to the receptacle receiving the electronic device, the wireless circuitry is configured to transmit the data to the electronic device, thereby causing a display assembly of the electronic device to present visual information in accordance with the data.

2. The accessory device of claim 1, wherein the data comprises an appearance of the body.

3. The accessory device of claim 2, wherein the appearance comprises a color.

4. The accessory device of claim 1, wherein the data comprises a theme.

5. The accessory device of claim 4, wherein the theme comprises one of a user-preferred interest and a location.

6. The accessory device of claim 1, wherein the data is transmitted subsequent to verification of an authentication received by the wireless circuitry from the electronic device.

7. An electronic device, comprising:
   a housing that defines an internal volume;
   wireless circuitry disposed in the internal volume, the wireless circuitry configured to receive data from an accessory device;
   a display assembly coupled with the housing, the display assembly configured to present visual information; and
   a processor disposed in the internal volume, the processor configured to:
      receive the data from the wireless circuitry, and
      instruct the display assembly to present the visual information in accordance with a characteristic of the accessory device, the characteristic transmitted with the data.

8. The electronic device of claim 7, wherein:
   the characteristic comprises an appearance of the accessory device, and
   the display assembly is altered in accordance with the appearance.

9. The electronic device of claim 8, wherein the appearance comprises a filter applied to the display assembly.

10. The electronic device of claim 7, wherein:
    the characteristic comprises a theme, and
    the display assembly is altered in accordance with the theme.

11. The electronic device of claim 10, wherein the theme comprises one of a user-preferred interest and a location.

12. The electronic device of claim 7, wherein the wireless circuitry receives the data when the housing is disposed in the accessory device.

13. The electronic device of claim 7, wherein the display assembly presents a message based on the data.

14. The electronic device of claim 7, further comprising a speaker module disposed in the internal volume, wherein the data transmitted via the speaker module.

15. A method for altering an appearance of an electronic device, the method comprising:
    by an accessory device comprising a receptacle that carries a memory circuit and wireless circuitry:
       receiving, within the receptacle, the electronic device;
       communicating, by the wireless circuitry, data to the electronic device, the data stored on the memory circuit; and
       causing, based on communicating the data, a display assembly of the electronic device to present visual information in accordance with the data.

16. The method of claim 15, wherein the data further causes a speaker module of the electronic device to present a message.

17. The method of claim 15, wherein the data comprises an appearance of the accessory device.

18. The method of claim 15, wherein the data comprises one of a user-preferred interest and a location.

19. The method of claim 15, further comprising, prior to communicating the data:
    receiving authentication information from the electronic device; and
    authenticating, based on the received authentication information, the electronic device.

20. The method of claim 15, wherein the data comprises a characteristic of the accessory device.

\* \* \* \* \*